United States Patent

Hayashi et al.

[11] Patent Number: 6,159,592
[45] Date of Patent: Dec. 12, 2000

[54] MAGNETIC RECORDING MEDIUM

[75] Inventors: Kazuyuki Hayashi; Keisuke Iwasaki; Hiroko Morii, all of Hiroshima, Japan

[73] Assignee: Toda Kogyo Corporation, Hiroshima-ken, Japan

[21] Appl. No.: 09/198,390

[22] Filed: Nov. 24, 1998

[30] Foreign Application Priority Data

Nov. 28, 1997 [JP] Japan ................................ 9-343834
Dec. 1, 1997 [JP] Japan ................................ 9-347068

[51] Int. Cl.[7] .................................................. G11B 05/733
[52] U.S. Cl. ................... 428/329; 428/404; 428/694 BS; 428/694 ST; 428/900; 420/125
[58] Field of Search ..................... 428/323, 329, 428/404, 694 BS, 694 ST, 900; 420/125

[56] References Cited

U.S. PATENT DOCUMENTS

| | | | |
|---|---|---|---|
| 5,484,545 | 1/1996 | Hayashi et al. | 252/62.58 |
| 5,750,250 | 5/1998 | Hayashi et al. | 428/328 |
| 5,773,133 | 6/1998 | Sasaki et al. | 428/216 |

FOREIGN PATENT DOCUMENTS

| | | |
|---|---|---|
| 0 597 694 A1 | 5/1994 | European Pat. Off. . |
| 0 691 307 A1 | 1/1996 | European Pat. Off. . |
| 0 769 775 A1 | 4/1997 | European Pat. Off. . |
| 63-153201 | 6/1988 | Japan . |
| 9-35245 | 7/1997 | Japan . |

*Primary Examiner*—Stevan A. Resan
*Attorney, Agent, or Firm*—Nixon & Vanderhye

[57] ABSTRACT

A magnetic recording medium comprising: a base film; a non-magnetic undercoat layer formed on said base film, comprising a binder resin and non-magnetic acicular particles containing iron as a main component, which particles comprise iron and zirconium of 0.05 to 30% by weight, calculated as Zr, based on the total weight of the particles, which is present within the particle; and a magnetic recording layer formed on said non-magnetic undercoat layer and comprising magnetic particles and a binder resin. Such a magnetic recording medium has a low light transmittance, an excellent smooth surface, a high mechanical strength and an excellent durability.

19 Claims, No Drawings

MAGNETIC RECORDING MEDIUM

BACKGROUND OF THE INVENTION

The present invention relates to a magnetic recording medium, and more particularly, to a magnetic recording medium having a low light transmittance, an excellent smooth surface, a high mechanical strength and an excellent durability, a non-magnetic substrate for the magnetic recording medium, having a non-magnetic undercoat layer, and non-magnetic zirconium-containing acicular particles containing iron as a main component.

With a development of miniaturized and lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Various attempts have been made at both enhancing the properties of magnetic particles and reducing the thickness of a magnetic recording layer in order to improve these properties of a magnetic recording medium.

The enhancement of the properties of magnetic particles will be firstly described.

The properties which magnetic particles are required to have in order to satisfy the above-described demands on a magnetic recording medium, are a high coercive force and a large saturation magnetization.

In recent years, as magnetic particles suitable for high-power and high-density recording, there have been widely used magnetic acicular iron oxide particles coated with a cobalt compound, magnetic acicular metal particles containing iron as a main component, which are produced by heat-reducing acicular goethite particles or acicular hematite particles in a reducing gas.

A reduction in the thickness of a magnetic recording layer will now be described. Video tapes have recently been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, a reduction in the thickness of a magnetic recording layer is also strongly demanded in order to improve the high output characteristics, especially, the S/N ratio of a magnetic recording medium. This fact is described, for example, on page 312 of *Development of Magnetic Materials and Technique for High Dispersion of Magnetic Powder*, published by Sogo Gijutsu Center Co., Ltd. (1982), " . . . the conditions for high-density recording in a coated-layer type tape are that the noise level is low with respect to signals having a short wavelength and that the high output characteristics are maintained. To satisfy these conditions, it is necessary that the tape has large coercive force Hc and residual magnetization Br, . . . and the coating film has a smaller thickness. . . . ".

Development of a thinner film for a magnetic recording layer has caused some problems. Firstly, it is necessary to make a magnetic recording layer smooth and to eliminate the non-uniformity of thickness. As well known, in order to obtain a smooth magnetic recording layer having a uniform thickness, the surface of the base film must also be smooth. This fact is described on pages 180 and 181 of *Materials for Synthetic Technology-Causes of Friction and Abrasion of Magnetic Tape and Head Running System and Measures for Solving the Problem* (hereinunder referred to as "*Materials for Synthetic Technology*" (1987), published by the Publishing Department of Technology Information Center, " . . . the surface roughness of a hardened magnetic layer depends on the surface roughness of the base film (back surface roughness) so largely as to be approximately proportional, . . . , since the magnetic layer is formed on the base film, the more smooth the surface of the base film is, the more uniform and larger head output is obtained and the more the S/N ratio is improved."Secondly, there has been caused a problem in the strength of a base film with a tendency of the reduction in the thickness of the base film in response to the demand for a thinner magnetic recording layer. This fact is described, for example, on page 77 of the above-described *Development of Magnetic Materials and Technique for High Dispersion of Magnetic Powder*, " . . . Higher recording density is a large problem assigned t the present magnetic tape. This is important in order to shorten the length of the magnetic tape so as to miniaturize the size of a cassette and to enable long-time recording. For this purpose, it is necessary to reduce the thickness of a base film . . . . With the tendency of reduction in thickness of the magnetic tape, the stiffness of the magnetic tape also reduces to such an extent as to make smooth travel in a recorder difficult. Therefore, improvement of the stiffness of a videotape both in the machine direction and in the transverse direction is now strongly demanded. . . . "

The end portion of a magnetic recording medium such as a magnetic tape, especially, a videotape is judged by detecting a portion of the magnetic recording medium at which the light transmittance is large by a video deck. If the light transmittance of the whole part of a magnetic recording layer is made large by the production of a thinner magnetic recording medium or the ultrafine magnetic particles dispersed in the magnetic recording layer, it is difficult to detect the portion having a large light transmittance by a video deck. For reducing the light transmittance of the whole part of a magnetic recording layer, carbon black or the like is added to the magnetic recording layer. It is, therefore, essential to add carbon black or the like to a magnetic recording layer in the present videotapes.

However, addition of a large amount of non-magnetic particles such as carbon black impairs not only the enhancement of the recording density but also the development of a thinner recording layer. In order to reduce the magnetization depth from the surface of the magnetic tape and to produce a thinner magnetic recording layer, it is strongly demanded to reduce, as much as possible, the quantity of non-magnetic particles such as carbon black which are added to a magnetic recording layer.

It is, therefore, strongly demanded that the light transmittance of a magnetic recording layer should be small even if the carbon black or the like which is added to the magnetic recording layer is reduced to a small amount. From this point of view, improvements in the non-magnetic substrate are now in strong demand.

There is no end to a demand for a higher performance in recent magnetic recording media. Since the above-described reduction in the thickness of a magnetic recording layer and a base film lowers the durability of the surface of the magnetic recording layer and the magnetic recording medium, an improvement of the durability of the surface of the magnetic recording layer and the magnetic recording medium is in strong demand.

This fact is described in Japanese Patent Application Laid-Open (KOKAI) No. 5-298679, " . . . With the recent development in magnetic recording, a high picture quality and a high sound quality have been required more and more in recording. The signal recording property is, therefore, improved. Especially, finer and higher-density ferromagnetic particles have come to be used. It is further required to make the surface of a magnetic tape smooth so as to reduce noise and raise the C/N. . . . However, the coefficient of friction between the magnetic layer and an apparatus during the travel of the magnetic tape increases, so that there is a tendency of the magnetic layer of the magnetic recording medium being damaged or exfoliated even in a short time. Especially, in a videotape, since the magnetic recording medium travels at a high speed in contact with the video head, the ferromagnetic particles are apt to be dropped from the magnetic layer, thereby causing clogging on the magnetic head. Therefore, an improvement in the running stability of the magnetic layer of a magnetic recording medium is expected. . . . "

Various efforts have been made to improve the non-magnetic substrate for a magnetic recording layer with a demand for a thinner magnetic recording layer and a thinner base film. A magnetic recording medium having at least one undercoat layer (hereinunder referred to "non-magnetic undercoat layer") comprising a binder resin and non-magnetic iron-based particles such as hematite particles, iron oxide hydroxide particles or the like, which are dispersed therein, on a base film such as a base film has been proposed and put to practical use (Japanese Patent Publication (KOKOKU) No. 6-93297 (1994), Japanese Patent Application Laid-Open (KOKAI) Nos. 62-159338 (1987), 63-187418 (1988), 4-167225 (1992), 4-325915 (1992), 5-73882 (1993), 5-182177 (1993), 5-347017 (1993), 6-60362 (1994), etc.)

In addition, as non-magnetic particles used in the non-magnetic undercoat layer, there are known such non-magnetic particles which surfaces are treated with a zirconium compound in order to improve the dispersibility in vehicle or the like (Japanese Patents Nos. 2,566,088, 2,571, 350 and 2,582,051, and Japanese Patent Applications Laid-open (KOKAI) Nos. 6-60362(1994), 9-22524(1997), 9-27117(1997), 5-73883 (1993), 6-60360(1994), 8-50718 (1996), 8-255334(1996), 9-27116(1997), 9-27117(1997) and 9-35245(1997)).

A magnetic recording medium which has small light transmittance, high strength, smooth surface and higher durability, with reduction of the thickness of not only the magnetic recording layer but also the base film is now in the strongest demand, but no such magnetic recording medium which sufficiently satisfies these conditions have ever been obtained.

The above-described magnetic recording media composed of a base film and a non-magnetic undercoat layer produced by dispersing non-magnetic particles in a binder resin and formed on a base film, have a small light transmittance, a smooth surface and a high strength, but the durability thereof is inconveniently poor.

This fact is described in Japanese Patent Application Laid-Open (KOKAI) No. 5-182177 (1993), ". . . Although the problem of surface roughness is solved by providing a magnetic layer as an upper layer after forming a thick non-magnetic undercoat layer on the surface of a base film, the problem of the abrasion of a head and the problem of durability are not solved and still remain. This is considered to be caused because a thermoset resin is usually used as a binder of the undercoat layer so that the magnetic layer is brought into contact with a head or other members without any cushioning owing to the hardened undercoat layer, and a magnetic recording medium having such an undercoat layer has a considerably poor flexibility."

As a result of the present inventors' earnest studies, it has been found that by using as non-magnetic acicular particles for a non-magnetic undercoat layer, non-magnetic acicular particles containing iron as a main component, comprising iron and zirconium of 0.05 to 30% by weight (calculated as Zr) based on the total weight of the particles, which is present within the particle, there can be obtained a magnetic recording medium having a low light transmittance, an excellent smooth surface, a high mechanical strength and an excellent durability. The present invention has been attained on the basis of this finding.

SUMMARY OF THE INVENTION

It is an object of the present invention to provide a magnetic recording medium which has a small light transmittance, an excellent smooth surface, a high strength and a high durability.

It is other object of the present invention to provide a non-magnetic substrate for a magnetic recording medium comprising a non-magnetic undercoat layer and a base film, having a small light transmittance, a high strength, a smoother surface, and a higher durability.

To accomplish the aims, in an aspect of the present invention, there are provided a magnetic recording medium comprising:

a base film;

a non-magnetic undercoat layer formed on said base film, comprising a binder resin and non-magnetic acicular particles containing iron as a main component, which particles comprise iron and zirconium of 0.05 to 30% by weight, calculated as Zr, based on the total weight of the particles, which is present within the particle; and a magnetic recording layer formed on said non-magnetic undercoat layer and comprising magnetic particles and a binder resin.

In a second aspect of the present invention, there is provided a magnetic recording medium comprising:

a base film;

a non-magnetic undercoat layer formed on said base film, comprising a binder resin, and non-magnetic acicular particles containing iron as a main component, which particles comprise as a core particle a acicular particle comprising iron and zirconium of 0.05 to 30% by weight, calculated as Zr, based on the total weight of the particle, which zirconium is present within the particle, and a coating layer formed on the surface of the core particle, comprising at least one compound selected from the group consisting of hydroxides of aluminum, oxides of aluminum, hydroxides of silicon and oxides of silicon; and a magnetic recording layer formed on the non-magnetic undercoat layer, and comprising magnetic particles and a binder resin.

In a third aspect of the present invention, there is provided a magnetic recording medium comprising:

a base film;

a non-magnetic undercoat layer formed on said base film, comprising a binder resin and non-magnetic acicular particles containing iron as a main component, which particles comprise iron and zirconium of 0.05 to 30% by weight, calculated as Zr, based on the total weight of the particles, which is present within the particle; and a magnetic recording layer formed on the non-magnetic undercoat layer, and comprising a binder and magnetic acicular metal particles containing iron as a main component, comprising iron and aluminum of 0.05 to 10% by weight (calculated as Al) based on the total weight of the particles.

In a fourth aspect of the present invention, there is provided a magnetic recording medium comprising:

a base film;

a non-magnetic undercoat layer formed on said base film, comprising a binder resin, and non-magnetic acicular particles containing iron as a main component, which particles comprise as a core particle a acicular particle comprising iron and zirconium of 0.05 to 30% by weight, calculated as Zr, based on the total weight of the particle, which zirconium is present within the particle, and a coating layer formed on the surface of the core particle, comprising at least one compound selected from the group consisting of hydroxides of aluminum, oxides of aluminum, hydroxides of silicon and oxides of silicon; and a magnetic recording layer formed on the non-magnetic undercoat layer, and comprising a binder and magnetic acicular metal particles containing iron as a main component, comprising iron and aluminum of 0.05 to 10% by weight (calculated as Al) based on the total weight of the particles.

In a fifth aspect of the present invention, there is provided a non-magnetic substrate for magnetic recording medium comprising:

a base film;

a non-magnetic undercoat layer formed on said base film, comprising a binder resin and non-magnetic acicular particles containing iron as a main component, which particles comprise iron and zirconium of 0.05 to 30% by weight, calculated as Zr, based on the total weight of the particles, which is present within the particle.

In a sixth aspect of the present invention, there is provided a non-magnetic substrate for magnetic recording medium comprising:

a base film;

a non-magnetic undercoat layer formed on said base film, comprising a binder resin, and non-magnetic acicular particles containing iron as a main component, which particles comprise as a core particle a acicular particle comprising iron and zirconium of 0.05 to 30% by weight, calculated as Zr, based on the total weight of the particle, which zirconium is present within the particle, and a coating layer formed on the surface of the core particle, comprising at least one compound selected from the group consisting of hydroxides of aluminum, oxides of aluminum, hydroxides of silicon and oxides of silicon.

In a seventh aspect of the present invention, there is provided non-magnetic acicular particles containing iron as a main component, comprising iron and zirconium of 0.05 to 30% by weight, calculated as Zr, based on the total weight of the particles, which is present within the particle; and having 0.005 to 0.3 µm of an average major axis diameter, 0.0025 to 0.15 µm of an average minor axis diameter, 2:1 to 20:1 of an aspect ratio (average major axis diameter/average minor axis diameter), not more than 1.50 in geometrical standard deviation of a major axial diameter distribution thereof, 35 to 300 m²/g of a BET specific surface area ($S_{BET}$), 0.5 to 2.5 of a $S_{BET}/S_{TEM}$ value, wherein $S_{TEM}$ represents a specific surface area calculated from values of major axial diameter and minor axial diameter obtained by measurement of particles on an electron microscope photograph, and not less than 60% of a resin adsorptivity.

In n eighth aspect of the present invention, there is provided non-magnetic acicular particles containing iron as a main component, comprising iron and zirconium of 0.05 to 30% by weight, calculated as Zr, based on the total weight of the particles, which is present within the particle; and having 0.005 to 0.3 µm of an average major axis diameter, 0.0025 to 0.15 µm of an average minor axis diameter, 2:1 to 20:1 of an aspect ratio (average major axis diameter/average minor axis diameter), not more than 1.50 in geometrical standard deviation of a major axial diameter distribution thereof, 35 to 300 m²/g of a BET specific surface area ($S_{BET}$), 0.5 to 2.5 of a $S_{BET}/S_{TEM}$ value, wherein Sac represents a specific surface area calculated from values of major axial diameter and minor axial diameter obtained by measurement of particles on an electron microscope photograph, and not less than 60% of a resin adsorptivity, and having a coating layer formed on the surface of the core particle and comprising at least one compound selected from the group consisting of hydroxides of aluminum, oxides of aluminum, hydroxides of silicon and oxides of silicon.

DETAILED DESCRIPTION OF THE INVENTION

The present invention is explained in detail below.

First, the magnetic recording medium having a non-magnetic undercoat layer according to the present invention is described.

As the non-magnetic acicular particles containing iron as a main component used in the present invention, there may be exemplified acicular iron oxide hydroxide particles such as acicular goethite particles (α-FeOOH), acicular hematite particles or the like. These non-magnetic acicular particles containing iron as a main component, contain zirconium in an amount of 0.05 to 30% by weight (calculated as Zr) based on the total weight of the particles, which is present within the particle, substantially uniformly.

When the zirconium content within the non-magnetic acicular particles containing iron as a main component is less than 0.05% by weight (calculated as Zr) based on the total weight of the particles, a magnetic recording medium having a non-magnetic undercoat layer containing such non-magnetic acicular particles containing iron as a main component does not have a sufficient durability. If the zirconium content exceeds 50% by weight (calculated as Zr) based on the total weight of the particles, although a magnetic recording medium having the non-magnetic undercoat layer containing such non-magnetic acicular particles containing iron as a main component has a sufficient durability, the durability-improving effect becomes saturated, so that it is meaningless to add zirconium more than necessary. From the point of view of durability of a magnetic recording medium, the zirconium content therein is preferably 0.5 to 25% by weight, more preferably 1.0 to 20% by weight (calculated as Zr) based on the total weight of the particles.

The non-magnetic acicular particles containing iron as a main component used in the present invention may include not only acicular shape but also spindle shape, rice ball shape or the like.

The non-magnetic acicular particles containing iron as a main component used in the present invention have an aspect ratio (average major axial diameter/average minor axial diameter) (hereinunder referred to merely as "aspect ratio") of 2:1 to 20:1.

If the aspect ratio is less than 2:1, it is difficult to obtain a desired film strength of the magnetic recording medium. If the aspect ratio is more than 20:1, there may be arisen many aggregations of the particles upon the preparation of the non-magnetic coating composition, thereby reducing the dispersibility and increasing the viscosity of the non-magnetic coating composition. With the consideration of the dispersibility in the vehicle and the strength of the coated film, the aspect ratio is preferably 3:1 to 10:1.

The average major axial diameter of the non-magnetic acicular particles containing iron as a main component used in the present invention is not more than 0.3 μm, preferably 0.005 to 0.3 μm. If the average major axial diameter exceeds 0.3 μm, the particle size is so large as to impair the surface smoothness of the coated film. On the other hand, if the average major axial diameter is less than 0.005 μm, dispersion in the vehicle may be unfavorably apt to be difficult because of the increase of the intermolecular force due to the fine particles. With the consideration of the dispersibility in the vehicle and the surface smoothness of the coated film, the more preferable average major axial diameter is 0.02 to 0.2 μm.

The average minor axial diameter of the non-magnetic acicular particles containing iron as a main component used in the present invention is preferably 0.0025 to 0.15 μm. If the average minor axial diameter is less than 0.0025 μm, dispersion in the vehicle may be unfavorably difficult because of the increase of the intermolecular force due to the fine particles. On the other hand if the average minor axial diameter exceeds 0.15 μm, the particle size may be apt to become so large as to impair the surface smoothness of the coated film. With the consideration of the dispersibility in the vehicle and the surface smoothness of the coated film, the more preferable average minor axial diameter is 0.01 to 0.10 μm.

The BET specific surface area of the non-magnetic acicular particles containing iron as a main component used in the present invention is usually 35 to 300 m²/g.

Specially, the BET specific surface area of the acicular goethite particles (α-FeOOH) as the non-magnetic particles containing iron as a main component used in the present invention is usually not less than 50 m²/g. If it is less than 50 m²/g, the acicular goethite particles may become coarse, which are apt to exert a deleterious influence on the surface smoothness of the coated film. The BET surface area is more preferably not less than 70 m²/g, even more preferably not less than 80 m²/g, and the upper limit thereof is usually 300 m²/g. The upper limit is preferably 250 m²/g, more preferably 200 m²/g with the consideration of the dispersibility in the vehicle.

The BET specific surface area of the acicular hematite particle is usually not less than 35 m²/g. If it is less than 35 m²/g, the acicular hematite particles may be coarse or sintering may be sometimes caused between particles, which are apt to exert a deleterious influence on the surface smoothness of the coated film. The BET surface area is more preferably not less than 40 m²/g, even more preferably not less than 45 m²/g, and the upper limit thereof is usually 300 m²/g. The upper limit is preferably 100 m²/g, more preferably 80 m²/g with the consideration of the dispersibility in the vehicle.

The major axial diameter distribution of the non-magnetic acicular particles containing iron as a main component used in the present invention is preferably not more than 1.50 in geometrical standard deviation. If it exceeds 1.50, the coarse particles existent sometimes exert a deleterious influence on the surface smoothness of the coated film. The major axial diameter distribution is more preferably not more than 1.40, even more preferably not more than 1.35 in geometrical standard deviation with the consideration of the surface smoothness of the coated film. From the point of view of industrial productivity, the lower limit thereof is preferably 1.01.

The resin adsorptivity of the non-magnetic acicular particles containing iron as a main component used in the present invention is usually not less than 60%, preferably not less than 65%, more preferably not less than 70%. The upper limit thereof is preferably 98%.

The degree of densification represented by the ratio of the specific surface area $S_{BET}$ measured by a BET method and the surface area $S_{TEM}$ calculated from the major axial diameter and the minor axial diameter which were measured from the particles in an electron micrograph (hereinafter referred to merely as "$S_{BET}/S_{TEM}$ value") of the non-magnetic acicular particles containing iron as a main component used in the present invention is usually 0.5 to 2.5.

When the $S_{BET}/S_{TEM}$ value of the non-magnetic acicular particles containing iron as a main component used in the present invention is less than 0.5, although the non-magnetic acicular particles containing iron as a main component have been densified, the particles may adhere to each other due to sintering therebetween and the particle size may increase, so that a sufficient surface smoothness of the coated film may be not obtained. On the other hand, when the $S_{BET}/S_{TEM}$ value exceeds 2.5, there may be many pores in the surfaces of particles and the dispersibility in the vehicle may become insufficient. With the consideration of the surface smoothness of the coated film and the dispersibility in the vehicle, the $S_{BET}/S_{TEM}$ value is preferably 0.7 to 2.0, more preferably 0.8 to 1.6.

The surfaces of the non-magnetic acicular particles containing iron as a main component used in the present invention may be coated with at least one coating material selected from the group consisting of a hydroxide of aluminum, an oxide of aluminum, a hydroxide of silicon and an oxide of silicon. When the non-magnetic acicular particles containing iron as a main component, which are coated with the above-described coating material are dispersed in a vehicle, the treated particles have an affinity with the binder resin and it is easy to obtain a desired dispersibility.

The amount of aluminum hydroxide, aluminum oxide, silicon hydroxide or silicon oxide used as the coating material is usually not more than 50% by weight, preferably 0.01 to 50% by weight (calculated as Al and/or $SiO_2$) based on the total weight of the particles. If it is less than 0.01% by weight (calculated as Al and/or $SiO_2$) based on the total weight of the particles, the dispersibility-improving effect caused by coating may be insufficient. If the amount exceeds 50% by weight (calculated as Al and/or $SiO_2$) based on the total weight of the particles, the dispersibility-improving effect caused by coating becomes saturated, so that it is meaningless to add a coating material more than necessary. From the point of view of dispersibility in the vehicle and industrial productivity, the more preferable amount of coating material is 0.05 to 20% by weight (calculated as Al and/or $SiO_2$) based on the total weight of the particles.

Various properties of the non-magnetic acicular particles containing iron as a main component which are coated with a coating material of the present invention, such as aspect ratio, average major axial diameter, average minor axial diameter, BET specific surface area, geometrical standard deviation of the major axial diameter, degree of densification and resin adsorptivity are approximately equivalent in values to those of the non-magnetic acicular particles containing iron as a main component used in the present invention the surfaces of which are not coated with a coating material.

A non-magnetic substrate according to the present invention will now be explained.

The non-magnetic substrate of the present invention comprises a base film and a non-magnetic undercoat layer formed on the base film, comprising a non-magnetic coating composition which contains the non-magnetic acicular particles containing iron as a main component and a binder resin.

As the base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the base film varies depending upon the material, but it is usually about 1 to 300 $\mu$m, preferably 2.0 to 200 $\mu$m. In the case of a magnetic disc, polyethylene terephthalate is usually used as the base film. The thickness thereof is usually 50 to 300 $\mu$m, preferably 60 to 200 $\mu$m. In the case of a magnetic tape, when polyethylene terephthalate is used as the base film, the thickness thereof is usually 3 to 100 $\mu$m, preferably 4 to 20 $\mu$m. When polyethylene naphthalate is used, the thickness thereof is usually 3 to 50 $\mu$m, preferably 4 to 20 $\mu$m. When polyamide is used, the thickness thereof is usually 2 to 10 $\mu$m, preferably 3 to 7 $\mu$m.

The thickness of the non-magnetic undercoat layer formed on the base film, is usually 0.2 to 10.0 $\mu$m, preferably 0.5 to 5.0 $\mu$m. If the thickness is less than 0.2 $\mu$m, not only it is impossible to ameliorate the surface roughness of the non-magnetic substrate but also the strength is insufficient. On the other hand, if the thickness is more than is 10.0 $\mu$m, since the thickness of the magnetic recording medium increases, the purpose of the reduction of the thickness thereof can not attained.

As the binder resin in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof. Each of these resin binders may contain a functional group such as —OH, —COOH, —SO$_3$M, —OPO$_2$M$_2$ and —NH2, wherein M represents H, Na or K. With the consideration of the dispersibility of the particles, a binder resin containing a functional group —COOH or —SO$_3$M is preferable.

The mixing ratio of the non-magnetic acicular particles containing iron as a main component with the binder resin is usually 5 to 2000 parts by weight, preferably 100 to 1000 parts by weight based on 100 parts by weight of the binder resin.

It is possible to add a lubricant, a polishing agent, an antistatic agent, etc. which are generally used for the production of a magnetic recording medium to the non-magnetic undercoat layer.

The gloss of the coating film (non-magnetic undercoat layer) containing the non-magnetic acicular particles containing iron as a main component used in the present invention is usually 170 to 280%, preferably 175 to 280%, more preferably 180 to 280% and the surface roughness Ra thereof is usually 2.0 to 15.0 nm, preferably 2.0 to 13.0 nm, more preferably 2.0 to 12.0 nm. The Young's modulus (relative value to a commercially available video tape: AV T-120 produced by Victor Company of Japan, Limited) of the non-magnetic undercoat layer is usually 125 to 150, preferably 127 to 150, more preferably 130 to 150.

In case of using the non-magnetic acicular particles containing iron as a main component as non-magnetic particles used in the non-magnetic undercoat layer, which are coated with at least one coating material selected from the group consisting of a hydroxide of aluminum, an oxide of aluminum, a hydroxide of silicon and an oxide of silicon, the gloss of the coating film (non-magnetic undercoat layer) is usually 175 to 280%, preferably 180 to 280%, more preferably 185 to 280%; the surface roughness Ra thereof is usually 2.0 to 13.0 nm, preferably 2.0 to 12.0 nm, more preferably 2.0 to 11.0 nm, and the Young's modulus (relative value to a commercially available video tape: AV T-120 produced by Victor Company of Japan, Limited) thereof is usually 128 to 150, preferably 130 to 150, more preferably 133 to 150.

Next, the magnetic recording medium according to the present invention is described.

The magnetic recording medium comprises a base film, the non-magnetic undercoat layer formed on the base film, and a magnetic recording layer formed on the non-magnetic undercoat layer, and comprising magnetic particles and a binder resin.

As the magnetic particles used in the present invention, magnetic particles containing iron as a main component are usable, and there may be exemplified magnetic iron oxide particles such as maghemite particles, magnetite particles, berthollide compound particles which are an intermediate oxide between maghemite and magnetite; particles obtained by incorporating any one or more different kinds of elements other than Fe, such as Co, Al, Ni, P, Zn, Si, B or the like in the said magnetic iron oxide particles; Co modified particles obtained by modifying the said magnetic iron oxide particles with cobalt; magnetic acicular metal particles containing iron as a main component and elements other than Fe at least one c selected from the group consisting of Co, Al, Ni, P, Si, Zn, Ti, B, Nd, La and Y, including magnetic acicular iron-based alloy particles; magnetoplumbite-type ferrite particles such as plate-like ferrite particles containing Ba, Sr or Ba—Sr; plate-like magnetoplumbite-type ferrite particles obtained by incorporating divalent metals (such as Co, Ni, Zn, Mg, Mn or the like) or tetravalent metals (such as Ti, Sn, Zr or the like) as a coercive force-reducing agent in the plate-like magnetoplumbite-type ferrite particles; or the like.

With the consideration of the high-density recording of the magnetic recording medium, among them, it is preferred magnetic metal particles containing iron as a main component, comprising iron and at least one selected from the group consisting of Co, Al, Ni, P, Si, Zn, Ti, B, Nd, La and Y. Further, the following magnetic acicular metal particles containing iron as a main component may be exemplified.

1) Magnetic acicular metal particles containing iron as a main component comprises iron; and Co of usually 0.05 to 40% by weight, preferably 1.0 to 35% by weight, more preferably 3 to 30% by weight (calculated as Co) based on the weight of the magnetic acicular metal particles containing iron as a main component.

2) Magnetic acicular metal particles containing iron as a main component comprises iron; Co of usually 0.05 to 40% by weight, preferably 1.0 to 35% by weight, more preferably 3 to 30% by weight (calculated as Co) based on the weight of the magnetic acicular metal particles containing iron as a main component; and at least one selected from the group consisting at of Nd, La and Y of usually 0.05 to 10% by weight, preferably 0.1 to 7% by weight (calculated as the corresponding element) based on the weight of the magnetic acicular metal particles containing iron as a main component.

3) Magnetic acicular metal particles containing iron as a main component comprises iron; Co of usually 0.05 to 40% by weight, preferably 1.0 to 35% by weight, more preferably 3 to 30% by weight (calculated as Co) based on the weight of the magnetic acicular metal particles containing iron as a main component; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles containing iron as a main component.

4) Magnetic acicular metal particles containing iron as a main component comprises iron; Co of usually 0.05 to 40% by weight, preferably 1.0 to 35% by weight, more preferably 3 to 30% by weight (calculated as Co) based on the weight of the magnetic acicular metal particles containing iron as a main component; at least one selected from the group consisting of Nd, La and Y of usually 0.05 to 10% by weight, preferably 0.1 to 7% by weight (calculated as the corresponding element) based on the weight of the magnetic acicular metal particles containing iron as a main component; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles containing iron as a main component.

It is more preferred magnetic acicular metal particles containing iron as a main component comprising iron and aluminum, and optionally at least one selected from the group consisting of Co, Ni, P, Si, Zn, Ti, Cu, B, Nd, La and Y. Further, the following magnetic acicular metal particles containing iron as a main component may be exemplified.

(1) Magnetic acicular metal particles containing iron as a main component comprises iron and usually 0.05 to 10% by weight, preferably 0.1 to 7% by weight of aluminum (calculated as Al) based on the weight of the magnetic acicular metal particles containing iron as a main component.

(2) Magnetic acicular metal particles containing iron as a main component comprises iron; usually 0.05 to 10% by weight, preferably 0.1 to 7% by weight of aluminum (calculated as Al) based on the weight of the magnetic acicular metal particles containing iron as a main component; and usually 0.05 to 40% by weight, preferably 1.0 to 35% by weight, more preferably 3 to 30% by weight of cobalt (calculated as Co) based on the weight of the magnetic acicular metal particles containing iron as a main component.

(3) Magnetic acicular metal particles containing iron as a main component comprises iron; usually 0.05 to 10% by weight, preferably 0.1 to 7% by weight of aluminum (calculated as Al) based on the weight of the magnetic acicular metal particles containing iron as a main component; and usually 0.05 to 10% by weight, preferably 0.1 to 7% by weight of at least one selected from the group consisting of Nd, La and Y (calculated as the corresponding element) based on the weight of the magnetic acicular metal particles containing iron as a main component.

(4) Magnetic acicular metal particles containing iron as a main component comprises iron; usually 0.05 to 10% by weight, preferably 0.1 to 7% by weight of aluminum (calculated as Al) based on the weight of the magnetic acicular metal particles containing iron as a main component; usually 0.05 to 40% by weight, preferably 1.0 to 35% by weight, more preferably 3 to 30% by weight of cobalt (calculated as Co) based on the weight of the magnetic acicular metal particles containing iron as a main component; and usually 0.05 to 10% by weight, preferably 0.1 to 7% by weight of at least one selected from the group consisting of Nd, La and Y (calculated as the corresponding element) based on the weight of the magnetic acicular metal particles containing iron as a main component.

(5) Magnetic acicular metal particles containing iron as a main component comprises iron; usually 0.05 to 10% by weight, preferably 0.1 to 7% by weight of aluminum (calculated as Al) based on the weight of the magnetic acicular metal particles containing iron as a main component; and usually 0.05 to 10% by weight, preferably 0.1 to 7% by weight of at least one selected from the group consisting of Ni, P, Si, Zn, Ti, Cu and B (calculated as the corresponding element) based on the weight of the magnetic acicular metal particles containing iron as a main component.

(6) Magnetic acicular metal particles containing iron as a main component comprises iron; usually 0.05 to 10% by weight, preferably 0.1 to 7% by weight of aluminum (calculated as Al) based on the weight of the magnetic acicular metal particles containing iron as a main component; usually 0.05 to 40% by weight, preferably 1.0 to 35% by weight, more preferably 3 to 30% by weight of cobalt (calculated as Co) based on the weight of the magnetic acicular metal particles containing iron as a main component; and usually 0.05 to 10% by weight, preferably 0.1 to 7% by weight of at least one selected from the group consisting of Ni, P, Si, Zn, Ti, Cu and B (calculated as the corresponding element) based on the weight of the magnetic acicular metal particles containing iron as a main component.

(7) Magnetic acicular metal particles containing iron as a main component comprises iron; usually 0.05 to 10% by weight, preferably 0.1 to 7% by weight of aluminum (calculated as Al) based on the weight of the magnetic acicular metal particles containing iron as a main component; usually 0.05 to 10% by weight, preferably 0.1 to 7% by weight of at least one selected from the group consisting of Nd, La and Y (calculated as the corresponding element) based on the weight of the magnetic acicular metal particles containing iron as a main component; and usually 0.05 to 10% by weight, preferably 0.1 to 7% by weight of at least one selected from the group consisting of Ni, P, Si, Zn, Ti, Cu and B (calculated as the corresponding element) based on the weight of the magnetic acicular metal particles containing iron as a main component.

(8) Magnetic acicular metal particles containing iron as a main component comprises iron; usually 0.05 to 10% by weight, preferably 0.1 to 7% by weight of aluminum (calculated as Al) based on the weight of the magnetic acicular metal particles containing iron as a main component; usually 0.05 to 40% by weight, preferably 1.0 to 35% by weight, more preferably 3 to 30% by weight of cobalt (calculated as Co) based on the weight of the magnetic acicular metal particles containing iron as a main component; usually 0.05 to 10% by weight, preferably 0.1 to 7% by weight of at least one selected from the group consisting of Nd, La and Y (calculated as the corresponding element) based on the weight of the magnetic acicular metal particles containing iron as a main component; and usually 0.05 to 10% by weight, preferably 0.1 to 7% by weight of at least one selected from the group consisting of Ni, P, Si, Zn, Ti, Cu and B (calculated as the corresponding element) based on the weight of the magnetic acicular metal particles containing iron as a main component.

The iron content in the particles is the balance, and is preferably 50 to 99% by weight, more preferably 60 to 95% by weight (calculated as Fe) based on the weight of the magnetic acicular metal particles containing iron as a main component.

The magnetic acicular metal particles containing iron as a main component comprising (i) iron and Al; (ii) iron, Co and Al, (iii) iron, Al and at least one rare-earth metal such as Nd, La and Y, or (iv) iron, Co, Al and at least one rare-earth metal such as Nd, La and Y is even more preferable from the point of the durability of the magnetic recording medium. Further, the magnetic acicular metal particles containing iron as a main component comprising iron, Al and at least one rare-earth metal such as Nd, La and Y is most preferable.

With respect to the existing position of aluminum of usually 0.05 to 10% by weight (calculated as Al) based on the weight of the magnetic acicular metal particles containing iron as a main component, it may be contained only in the core portion or the inside portion, or present on the surface portion of the magnetic acicular metal particles containing iron as a main component. Alternatively, aluminum may be approximately uniformly contained in the magnetic acicular metal particles containing iron as a main component from the core portion to the surface, and/or may be formed on the surfaces of the particles. In addition, any of these positions may be combined. In the consideration of the effect of improving the surface property of the magnetic recording layer or the durability of the magnetic recording medium, magnetic acicular metal particles containing iron as a main component uniformly containing aluminum from the core portion to the surface and coated with an aluminum-coating layer are more preferable.

When the content of aluminum exceeds 10% by weight, the effect of improving the durability of the magnetic recording layer or the magnetic recording medium is observed, but the effect is saturated and it is meaningless to add aluminum more than necessary. Further more, the magnetic characteristics of the magnetic acicular metal particles containing iron as a main component may be sometimes deteriorated due to an increase in the aluminum as a non-magnetic component. The existing amount of aluminum of the magnetic acicular metal particles containing iron as a main component is preferably 0.1 to 7% by weight.

The magnetic particles containing iron as a main component used in the present invention have an average major axial diameter of usually 0.01 to 0.50 $\mu$m, preferably 0.03 to 0.30 $\mu$m, an average minor axial diameter of usually 0.0007 to 0.17 $\mu$m, preferably 0.003 to 0.10 $\mu$m, and an aspect ratio of usually not less than 3:1, preferably and not less than 5 1. The upper limit of the aspect ratio is usually 15:1, preferably 10:1 with the consideration of the dispersibility in the vehicle. The shape of the a magnetic particles containing iron as a main component may have not only acicular but also spindle-shaped, rice ball-shaped, cubic-shaped, plate-like shaped or the like.

As to the magnetic properties of the magnetic iron oxide particles and Co modified magnetic iron oxide particles used in the present invention, the coercive force is preferably 250 to 1700 Oe, more preferably 300 to 1700 Oe, and the saturation magnetization is usually preferably 60 to 90 emu/g, more preferably 70 to 90 emu/g.

As to the magnetic properties of the magnetic acicular metal particles used in the present invention, the coercive force is preferably 800 to 3500 Oe, more preferably 900 to 3500 Oe, and the saturation magnetization is usually preferably 90 to 170 emu/g, more preferably 110 to 170 emu/g.

As to the magnetic properties of the magnetoplumbite-type ferrite particles used in the present invention, the coercive force is preferably 800 to 4000 Oe, more preferably 900 to 4000 Oe, and the saturation magnetization is usually preferably 40 to 70 emu/g, more preferably 45 to 70 emu/g.

It is preferred that the resin adsorptivity of the magnetic particles used in the present invention is enhanced. Especially, it is preferred to use the magnetic acicular metal particle containing iron as a main component and aluminum, having the resin adsorptivity of not less than 65%. With the consideration of the durability of the magnetic recording medium, the resin adsorptivity is more preferably not less than 68%, still more preferably 70%.

As the binder resin for the magnetic recording layer, the same binder resin as that used for the production of the non-magnetic undercoat layer is usable.

The thickness of the magnetic recording layer formed on the surface of the non-magnetic undercoat layer is usually in the range of 0.01 to 5.0 $\mu$m. If the thickness is less than 0.01 $\mu$m, uniform coating may be difficult, so that unfavorable phenomenon such as unevenness on the coating surface is observed. On the other hand, when the thickness exceeds 5.0 $\mu$m, it may be difficult to obtain desired signal recording property due to an influence of diamagnetism. The preferable thickness is in the range of 0.05 to 1.0 $\mu$m.

The mixing ratio of the magnetic particles containing iron as a main component with the binder resin in the magnetic recording layer is usually 200 to 2000 parts by weight, preferably 300 to 1500 parts by weight based on 100 parts by weight of the binder resin.

It is possible to add a lubricant, a polishing agent, an antistatic agent, etc. which are generally used for the production of a magnetic recording medium to the magnetic recording layer.

The magnetic recording medium according to the present invention, wherein magnetic iron oxide particles or Co-modified magnetic iron oxide particles are used as the magnetic particles, has a coercive force of usually 250 to 1700 Oe, preferably 300 to 1700 Oe; a squareness (residual magnetic flux density Br/saturation magnetic flux density Bm) of usually 0.85 to 0.95, preferably 0.86 to 0.95; a gloss (of the magnetic recording layer) of usually 130 to 200%, preferably 140 to 200%; a surface roughness Ra (of the magnetic recording layer) of usually not more than 12.0 nm, preferably 2.0 to 11.0 nm, more preferably 2.0 to 10.0 nm; a Young's modulus (relative value to a commercially available video tape: AV T-120 produced by Victor Company of Japan, Limited) of usually 125 to 160, preferably 130 to 160; and a linear adsorption coefficient (of the magnetic recording layer) of usually 1.10 to 2.00 $\mu m^{-1}$, preferably 1.20 to 2.00 $\mu m^{1}$. As to the durability, the running durability is usually not less than 15 minutes, preferably not less than 20 minutes, more preferably not less than 22 minutes. Also, the scratch resistance is usually A or B, preferably A, when evaluated into four ranks: A (No scratch), B (A few scratches), C (Many scratches) and D (A great many scratches).

In case of using the magnetic acicular metal particles containing iron as a main component, as the magnetic particles, the magnetic recording medium according to the present invention has a coercive force of usually 800 to 3500 Oe, preferably 900 to 3500 Oe; a squareness (residual magnetic flux density Br/saturation magnetic flux density Bm) of usually 0.85 to 0.95, preferably 0.86 to 0.95; a gloss (of the magnetic recording layer) of usually 180 to 300%, preferably 190 to 300%; a surface roughness Ra (of the magnetic recording layer) of usually not more than 12.0 nm, preferably 2.0 to 11.0 nm, more preferably 2.0 to 10.0 nm; a Young's modulus (relative value to a commercially available video tape: AV T-120 produced by Victor Company of Japan, Limited) of usually 124 to 160, preferably 128 to 160; and a linear adsorption coefficient (of the magnetic recording layer) of usually 1.10 to 2.00 $\mu m^{-1}$, preferably 1.20 to 2.00 $\mu m^{-1}$. As to the durability, the running durability is usually not less than 20 minutes, preferably not less than 22 minutes, more preferably not less than 24 minutes. Also, the scratch resistance is usually A or B, preferably A, when evaluated into four ranks: A (No scratch), B (A few scratches), C (Many scratches) and D (A great many scratches).

In case of using the magnetoplumbite-type ferrite particles as the magnetic particles, the magnetic recording medium according to the present invention has a coercive force of usually 800 to 4000 Oe, preferably 900 to 4000 Oe; a squareness (residual magnetic flux density Br/saturation magnetic flux density Bm) of usually 0.85 to 0.95, preferably 0.86 to 0.95; a gloss (of the magnetic recording layer) of usually 160 to 300%, preferably 170 to 300%; a surface roughness Ra (of the magnetic recording layer) of usually not more than 12.0 nm, preferably 2.0 to 11.0 nm, more preferably 2.0 to 10.0 nm; a Young's modulus (relative value to a commercially available video tape: AV T-120 produced by Victor Company of Japan, Limited) of usually 124 to 160, preferably 128 to 160; and a linear adsorption coefficient (of the magnetic recording layer) of usually 1.10 to 2.00 $\mu m^{-1}$, preferably 1.20 to 2.00 $\mu m^{-1}$. As to the durability, the running durability is usually not less than 20 minutes, preferably not less than 22 minutes, more preferably not less than 24 minutes. Also, the scratch resistance is usually A or B, preferably A, when evaluated into four ranks: A (No scratch), B (A few scratches), C (Many scratches) and D (A great many scratches).

Next, there is described a process for producing acicular goethite particles substantially uniformly containing zirconium which is present within the particle, and acicular hematite particles substantially uniformly containing zirconium which is present within the particle according to the present invention.

The acicular goethite particles substantially uniformly containing zirconium which is present within the particle may be produced by causing a zirconium compound to previously exist at amount of 0.04 to 40 mol % (calculated as Zr) based on the mole of Fe, in a suspension containing iron-containing precipitates such as hydroxides or carbonates of iron which can be obtained by reacting a ferrous salt with alkali hydroxide, alkali carbonate or both thereof, before an oxygen-containing gas such as air is passed through the suspension to form the acicular goethite particles, as described hereinafter. More specifically, the zirconium compound may be preliminarily added to any of the aqueous ferrous salt solution, the aqueous alkali hydroxide solution, the aqueous alkali carbonate solution and the iron-containing precipitates. Among them, the addition to the aqueous ferrous salt solution is most preferred.

As the zirconium compound, there may be used zirconium sulfate, zirconium oxy-sulfate, zirconium chloride, zirconium nitrate, zirconium acetate or the like.

The thus obtained acicular goethite particles can provide particles in which zirconium is substantially uniformly incorporated in a whole portion thereof from a central portion up to a surface portion.

Acicular goethite particles are produced by an ordinary method:

(A) a method of oxidizing a suspension having a pH value of not less than 11 and containing colloidal ferrous hydroxide particles which is obtained by adding not less than an equivalent of an alkali hydroxide solution to an aqueous ferrous salt solution, by passing an oxygen-containing gas thereinto at a temperature of not higher than 80° C.;

(B) a method of producing spindle-shaped goethite particles by oxidizing a suspension containing $FeCO_3$ which is obtained by reacting an aqueous ferrous salt solution with an aqueous alkali carbonate solution, by passing an oxygen-containing gas thereinto after aging the suspension, if necessary;

(C) a method of producing spindle-shaped goethite particles by oxidizing a suspension containing precipitates containing iron which is obtained by reacting an aqueous ferrous salt solution with an aqueous alkali carbonate solution and an alkali hydroxide solution, by passing an oxygen-containing gas thereinto after aging the suspension, if necessary;

(D) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, adding not less than an equivalent of an alkali hydroxide solution to the $Fe^{2+}$ in the aqueous ferrous salt solution, to the aqueous ferrous salt solution containing the acicular goethite seed particles, and passing an oxygen-containing gas into the aqueous ferrous salt solution;

(E) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, adding not less than an equivalent of an aqueous alkali carbonate solution to the $Fe^{2+}$ in the aqueous ferrous salt solution, to the aqueous ferrous salt solution containing the acicular goethite seed particles, and passing an oxygen-containing gas into the aqueous ferrous salt solution; and (F) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles and growing the obtained acicular seed goethite particles in an acidic or neutral region.

Elements other than Fe and Zr such as Ni, Zn, P and Si, which are generally added in order to enhance various properties of the particles such as the major axial diameter, the minor axial diameter and the aspect ratio, may be added during the reaction system for producing the goethite particles.

Next, there is described a process for producing acicular hematite particles substantially uniformly containing zirconium within the particle.

The acicular hematite particles substantially uniformly containing zirconium within the particle may be produced by heat-dehydrating the above-mentioned acicular goethite particles substantially uniformly containing zirconium within the particle.

The temperature of the heat-dehydration is preferably 250 to 850° C. In order to obtain high-density acicular hematite particles substantially uniformly containing zirconium within the particle, the temperature of the heat-dehydration is preferably 550 to 850° C.

Especially, in the case where the heat dehydration is conducted at an elevated temperature as high as not less than 550° C., it is preferred that the surfaces of the acicular goethite particles be coated with an anti-sintering agent prior to the heat-dehydration, as is well known in the art.

As the sintering preventive, sintering preventives generally used are usable. For example, phosphorus compounds such as sodium hexametaphosphate, polyphospholic acid and orthophosphoric acid, silicon compounds such as #3 water glass, sodium orthosilicate, sodium metasilicate and colloidal silica, boron compounds such as boric acid, aluminum compounds including aluminum salts such as aluminum acetate, aluminum sulfate, aluminum chloride and aluminum nirate, alkali aluminate such as sodium aluminate, and aluminum compounds such as alumina sol and aluminum hydroxide, and titanium compounds such as titanyl sulfate may be exemplified.

The amount of the anti-sintering agent applied onto the surfaces of the acicular goethite particles is about 0.05 to 10% by weight based on the total weight of the particles.

In order to obtain high-density acicular hematite particles which can maintain a particle shape of the acicular goethite particles, it is preferred that the acicular goethite particles are first heat-treated at a temperature as low as 250 to 500° C. to form low-density acicular hematite particles containing zirconium which is present within the particle, and then the low-density hematite particles are heat-treated at an elevated temperature as high as 550 to 850° C.

If the temperature for heat-treating the goethite particles is less than 250° C., the dehydration reaction takes a long time. On the other hand, if the temperature exceeds 500° C., the dehydration reaction is abruptly brought out, so that it is difficult to retain the shapes because the sintering between particles is caused. The low-density acicular hematite particles obtained by heat-treating the acicular goethite particles at a low temperature are low-density particles having a large number of dehydration pores through which $H_2O$ is removed from the acicular goethite particles and the BET specific surface area thereof is about 1.2 to 2 times larger than that of the acicular goethite particles as the starting material.

The low-density acicular hematite particles obtained by heat-treating the acicular goethite particles coated with a sintering preventive at a temperature of 250 to 500° C. have an average major axial diameter of usually 0.005 to 0.30 μm, an average minor axial diameter of usually 0.0025 to 0.15 μm, a BET specific surface area of usually about 70 to 350 $m^2/g$.

The low-density acicular hematite particles are then heat-treated at a temperature of not less than 550° C. to obtain a high-density acicular hematite particles. The upper limit of the heating temperature is preferably 850° C.

If the heat-treating temperature is less than 550° C., since the densification is insufficient, a large number of dehydration pores exist within and on the surface of the acicular hematite particles, so that the dispersion in the vehicle may become insufficient. Further, when the non-magnetic undercoat layer is formed from these particles, it is difficult to obtain a coated film having a smooth surface. On the other hand, if the temperature exceeds 850° C., although the densification of the acicular hematite particles is sufficient, since sintering is caused on and between particles, the particle size increases, so that it is difficult to obtain a coated film having a smooth surface.

The non-magnetic acicular particles containing iron as a main component used in the present invention may be coated with at least one selected from the group consisting of a c hydroxide of aluminum, an oxide of aluminum, a hydroxide of silicon and an oxide of silicon, if necessary.

In order to coat the non-magnetic acicular particles containing iron as a main component, an aluminum compound and/or a silicon compound is added to and mixed with an aqueous suspension under stirring which is obtained by dispersing the cake or dried particles of the non-magnetic acicular particles containing iron as a main component into an aqueous solution. After mixing and stirring, the pH value of the mixed solution is adjusted, if necessary. The non-magnetic acicular particles containing iron as a main component thus coated with at least one selected from the group consisting of a hydroxide of aluminum, an oxide of aluminum, a hydroxide of silicon and an oxide of silicon are then filtered out, washed with water, dried and pulverized. They may be further deaerated and compacted, if necessary.

As the aluminum compound for the coating, the same aluminum compounds as those described above as the sintering preventive are usable.

The amount of aluminum compound added is 0.01 to 50.00% by weight (calculated as Al) based on the total weight of the particles. If the amount of aluminum compound added is less than 0.01% by weight, the wet property to the binder resin is insufficient and the improvement of the dispersibility in the vehicle may be insufficient. On the other hand, if the amount of aluminum compound added exceeds 50% by weight, the coating dispersibility improving effect becomes saturated, so that it is meaningless to add an aluminum compound more than necessary.

As the silicon compound, the same silicon compounds as those described above as the sintering preventive are usable.

The amount of silicon compound added is 0.01 to 50% by weight (calculated as $SiO_2$) based on the total weight of the particles. If the amount of aluminum compound added is less than 0.01% by weight, the conformability to the binder resin is insufficient and the improvement of the dispersibility in the vehicle may be insufficient. On the other hand, if the amount of aluminum compound added exceeds 50% by weight, the coating dispersibility improving effect becomes saturated, so that it is meaningless to add an silicon compound more than necessary.

When both an aluminum compound and a silicon compound are used, the amount thereof used is preferably 0.01 to 50% by weight (calculated as Al and $SiO_2$) based on the total weight of the particles.

Next, there is described a process for producing a non-magnetic substrate for magnetic recording medium having a non-magnetic undercoat layer according to the present invention.

The non-magnetic substrate for magnetic recording medium according to the present invention can be obtained by applying a non-magnetic coating composition containing the non-magnetic acicular particles containing iron as a main component, a binder resin and a solvent, onto the base film, followed by drying.

As the solvents, there may be used methyl ethyl ketone, toluene, cyclohexanone, methyl isobutyl ketone, tetrahydrofuran, a mixture of these solvents or the like.

The total amount of the solvent used is 50 to 1,000 parts by weight based on 100 parts by weight of the non-magnetic acicular particles. When the amount of the solvent used is less than 50 parts by weight, the viscosity of the non-magnetic coating composition prepared therefrom becomes too high, thereby making it difficult to apply the non-magnetic coating composition. On the other hand, when the amount of the solvent used is more than 1,000 parts by weight, the amount of the solvent volatilized during the formation of the coating film becomes too large, thereby rendering the coating process industrially disadvantageous.

Next, there is described a process for producing the magnetic recording medium according to the present invention.

The magnetic recording medium according to the present invention can be produced by applying a magnetic coating composition containing the magnetic particles, a binder resin and a solvent, on the non-magnetic undercoat layer, followed by drying, to form a magnetic recording layer thereon.

As the solvents, there may be used methyl ethyl ketone, toluene, cyclohexanone, methyl isobutyl ketone, tetrahydrofuran, a mixture of these solvents or the like.

The total amount of the solvent used is 50 to 1,000 parts by weight based on 100 parts by weight of the magnetic particles. When the amount of the solvent used is less than 50 parts by weight, the viscosity of the magnetic coating composition prepared therefrom becomes too high, thereby making it difficult to apply the magnetic coating composition. On the other hand, when the amount of the solvent used is more than 1,000 parts by weight, the amount of the solvent volatilized during the formation of the coating film becomes too large, thereby rendering the coating process industrially disadvantageous.

The magnetic acicular metal particles containing iron as a main component containing aluminum within the particles are produced, as is well known, by adding an aluminum compound at an appropriate stage during the above-described process for producing acicular goethite particles to produce acicular goethite particles containing aluminum at desired positions of the particles, and reducing at a temperature of 300 to 500° C., the acicular goethite particles or the acicular hematite particles containing aluminum at desired positions within the particles which are obtained by dehydrating the acicular goethite particles.

The magnetic acicular metal particles containing iron as a main component coated with oxide of aluminum are produced by reducing at a temperature of 300 to 500° C., the acicular goethite particles coated with an oxide or hydroxide of aluminum, or the acicular hematite particles coated with the oxide or hydroxide of aluminum which are obtained by dehydrating the acicular goethite particles.

It is an important in aspects of the present invention is the fact that when the non-magnetic acicular particles containing iron as a main component which contain 0.05 to 30% by weight (calculated as Zr) based on the total weight of the particles of zirconium within the particle, and if necessary, the surfaces of which are coated with at least one selected from the group consisting of a hydroxide of aluminum, an oxide of aluminum, a hydroxide of silicon and an oxide of silicon, are used as the non-magnetic particles for a non-magnetic undercoat layer, it is possible to enhance the surface smoothness of the non-magnetic undercoat layer and strength of the non-magnetic substrate; and when the magnetic recording layer is formed on the non-magnetic undercoat layer, it is possible to reduce the light transmittance of the magnetic recording layer and to produce a magnetic medium having a smooth surface, a high strength and an excellent durability.

The reason why the smooth surface of the non-magnetic undercoat layer and the strength of the non-magnetic substrate and durability of the magnetic recording layer are enhanced is considered to be as follows. By using the non-magnetic acicular particles containing iron as a main component, comprising iron and zirconium which is present uniformly within the particle, as the non-magnetic particles, since the binder resin adsorptivity of the non-magnetic particles in the vehicle is enhanced, as will be shown in later-described examples, the degree of adhesion of the non-magnetic particles in the non-magnetic undercoat layer or the non-magnetic undercoat layer itself to the base film is enhanced.

It is further important in aspects of the present invention is the fact that when the non-magnetic acicular particles containing iron as a main component which contain zirconium of 0.05 to 30% by weight (calculated as Zr) based on the total weight of the particles, which is present within the particles, and if necessary, the surfaces of which are coated with at least one selected from the group consisting of a hydroxide of aluminum, an oxide of aluminum, a hydroxide of silicon and an oxide of silicon, are used as the non-magnetic particles for a non-magnetic undercoat layer, and when the magnetic acicular metal particles containing iron as a main component which contain 0.05 to 10% by weight (calculated as Al) of aluminum within the particle, are used as the magnetic particles for a magnetic recording layer, it is possible to reduce the light transmittance of the magnetic recording layer and to produce a magnetic medium having a smooth surface, a high strength and a more excellent durability.

The reason why the durability of the surface of the magnetic recording medium is more enhanced is considered that the durability thereof is due to the synergistic effect of using the non-magnetic acicular particles containing iron as a main component, containing zirconium uniformly within the particle as the non-magnetic particles, and using the magnetic acicular metal particles containing iron as a main component, comprising iron and aluminum which is present within the particle, as the magnetic particles. More specifically, it is considered that since the resin adsorptivity of both the non-magnetic particles and the magnetic particles in the vehicles are enhanced due to the use of the above-described particles, as will be shown in later-described examples, the degree of adhesion of the non-magnetic particles in the non-magnetic undercoat layer or the non-magnetic undercoat layer itself to the base film is enhanced, and the degree of adhesion of the magnetic particles in the magnetic recording layer and the magnetic recording layer itself to the non-magnetic undercoat layer is enhanced.

Especially, as non-magnetic particles by using the non-magnetic acicular particles containing iron as a main component, containing zirconium which is present within the particle, the non-magnetic substrate in the aspects of the present invention has a high smooth surface and a high strength; and the magnetic recording medium in the aspects of the present invention having the non-magnetic undercoat layer containing the above-mentioned non-magnetic acicular particles has a small light transmittance, a smooth surface, a high strength and an excellent durability. That is, this magnetic medium is preferable as a high-density magnetic medium.

Further, as non-magnetic particles by using the non-magnetic acicular particles containing iron as a main component, containing zirconium which is present within the particle, the non-magnetic substrate in the aspects of the present invention has a high smooth surface and a high strength; and the magnetic recording medium in the aspects of the present invention having the non-magnetic undercoat layer containing the above-mentioned non-magnetic acicular particles and the magnetic recording layer containing the magnetic metal particles containing iron as a main component and aluminum which is present within the particle as the magnetic particles has a small light transmittance, a high smooth surface, a high strength and a more excellent durability. That is, the magnetic medium is preferable as a high-density magnetic medium.

EXAMPLES

The present invention is described in more detail by Examples and Comparative Examples, but the Examples are only illustrative and, therefore, not intended to limit the scope of the present invention.

Various properties were evaluated by the following methods.

(1) The average major axial diameter and the average minor axial diameter of the particles are expressed by the ff average values of 350 particles measured in the photograph obtained by magnifying an electron micrograph (×30000) by 4 times in the vertical and horizontal directions, respectively. The aspect ratio is the ratio of the average major axial diameter and the average minor axial diameter.

(2) The geometrical standard deviation of particle size distribution of the major axial diameter was obtained by the following method.

The major axial diameters of the particles were measured from the magnified electron microphotograph in the above-mentioned (1). The actual major axial diameters of the particles and the number of particles were obtained from the calculation on the basis of the measured values. On logarithmico-normal probability paper, the major axial diameters were plotted at regular intervals on the abscissa-axis and the accumulative number of particles belonging to each interval of the major axial diameters was plotted by percentage on the ordinate-axis by a statistical technique. The major axial diameters corresponding to the number of particles of 50% and 84.13%, respectively, were read from the graph, and the geometrical standard deviation was measured from the following formula:

Geometrical standard deviation)={major axial diameter ($\mu$m) corresponding to 84.13% under integration sieve}/{major axial diameter (geometrical average diameter) corresponding to 50% under integration sieve}.

The smaller the geometrical standard deviation, the more excellent the particle size distribution of the major axial diameters of the particles.

(3) The specific surface area is expressed by the value measured by a BET method.

(4) The degree of denseness of the particles is represented by $S_{BET}/S_{TEM}$ value as described above. $S_{BET}$ is a specific surface area measured by the above-described BET method. $S_{TEM}$ is a value calculated from the average major axial diameter d cm and the average minor axial diameter w cm measured from the electron microphotograph described in (1) on the assumption that a particle is a rectangular parallelopiped in accordance with the following formula:

$$S_{TEM}(m^2/g)=\{(4 \cdot d \cdot w+2w^2)/(d \cdot w^2 \cdot \rho_p)\} \times 10^{-4}$$

wherein $\rho_p$ is the true specific gravity of the hematite particles, and 5.2 g/cm$^3$ was used.

(5) The content of each of Zr, Al, Si, P, B and Nd in the particle was measured by a fluorescent X-ray spectroscopy device 3063 M type (manufactured by RIGAKU DENKI KOGYO CO., LTD.) according to JIS K0119 "General rule of from fluorescent X-ray analysis".

(6) The viscosity of the coating composition was obtained by measuring the viscosity of the coating composition at 25° C. at a shear rate D of 1.92 sec$^{-1}$ by using an "E type viscometer EMD-R" (manufactured by Tokyo Keiki, Co., Ltd.).

(7) The resin adsormtivity of the particles represents the degree at which a resin is adsorbed to the particles. The closer to 100 the value obtained in the following manner, the firmer the resin adsorption to the particle surface in the vehicle.

The resin adsorption Wa was first obtained. 20 g of particles and 56 g of a mixed solvent (27.0 g of methyl ethyl ketone, 16.2 g of toluene, and 10.8 g of cyclohexanone) with 2 g of a vinyl chloride-vinyl acetate copolymer having a sodium sulfonate group dissolved therein were charged into a 100-ml polyethylene bottle together with 120 g of 3 mm$\phi$ steel beads. The particles and the solvent were mixed and dispersed by a paint shaker for 60 minutes.

Thereafter, 50 g of the coating composition was taken out, and charged into a 50-ml settling cylinder. The solid content was separated from the solvent portion by the centrifugal-ization at a rate of 10000 rpm for 15 minutes. The concentration of the solid resin content contained in the solvent portion was determined by a gravimetric method and the resin content existing in the solid portion was determined by deducting the obtained resin content from the amount of the resin charged as the resin adsorption Wa (mg/g) to the particles.

The total quantity of separated solid content was taken into a 100 ml-tall beaker, and 50 g of a mixed solvent (25.0 g of methyl ethyl ketone, 15.0 g of toluene, and 10.0 g of cyclohexanone) was added thereto. The obtained mixture was to ultrasonic dispersion for 15 minutes, and the thus-obtained suspension was charged into a 50-ml settling cylinder. The solid content was separated from the solvent portion by centrifuging them at a rate of 10000 rpm for 15 minutes. The concentration of the solid resin content contained in the solvent portion was measured so as to determine the resin content dissolved from the resin which had been adsorbed to the particle surfaces into the solvent phase.

The process from the step of taking the solid content into the 100 ml-tall beaker to the determination of the resin content dissolved into the solvent phase was repeated twice. The total quantity We (mg/g) of resin content dissolved into the solvent phase in the three cycles was obtained, and the value calculated in accordance with the following formula is expressed as the resin adsorptivity T(%):

$$T(\%)=[(Wa-We)/Wa] \times 100.$$

(8) The gloss of the surface of the coating film of each of the non-magnetic undercoat layer and the magnetic recording layer was measured at an angle of incidence of 45° by a "glossmeter UGV-5D" (manufactured by Suga Shikenki, Co., Ltd.).

(9) The surface roughness Ra is expressed by the average value of the center-line average roughness of the profile curve of the surface of the coating film by using "Surfcom-575A" (manufactured by Tokyo Seimitsu Co., Ltd.).

(10) The durability of the magnetic medium was evaluated by the following running durability and the scratch resistance.

The running durability was evaluated by the actual operating time under the conditions that the load was 200 gw and the relative speed of the head and the tape was 16 m/s by using "Media Durability Tester MDT-3000" (manufactured by Steinberg Associates). The longer the actual operating time, the higher the running durability.

The scratch resistance was evaluated by observing through the microscope the surface of the magnetic tape after running and visually judging the degree of scratching. Evaluation was divided into the following four ranks.

A: No scratch

B: A few scratches

C: Many scratches

D: A great many scratches

(11) The strength of the coating film was expressed the Young's modulus obtained by "Autograph" (produced by Shimazu Seisakusho Co., Ltd.). The Young's modulus was expressed by the ratio of the Young's modulus of the coating film to that of a commercially available video tape "AV T-120" (produce by Victor Company of Japan, Limited). The higher the relative value, the more the strength of the coating film is favorable.

(12) The magnetic properties of the magnetic particles and magnetic recording medium were measured under an external magnetic field of 10 kOe by "Vibration Sample Magnetometer VSM-3S-15 (manufactured by Toei Kogyo, Co., Ltd.)".

(13) The light transmittance is expressed by the linear adsorption coefficient measured by using "UV-Vis Recording Spectrophotometer UV-2100" (manufactured by Shimazu Seisakusho, Ltd.). The linear adsorption coefficient is defined by the following formula, and the larger the value, the more difficult it is for the magnetic sheet to transmit light:

Linear adsorption coefficient $(\mu m^{-1}) = \{\ln(1/t)\}/FT$ wherein t represents a light transmittance (–) at $\lambda$=900 nm, and FT represents thickness ($\mu m$) of the coating composition of the coating film used for the measurement.

(14) The thickness of each of the base film, the non-magnetic undercoat layer and the magnetic recording layer constituting the magnetic recording medium was measured in the following manner by using a Digital Electronic Micrometer K351C (manufactured by Anritsu Corp.)

The thickness (A) of a base film was first measured. Similarly, the thickness (B) (B=the sum of the thicknesses of the base film and the non-magnetic undercoat layer) of a non-magnetic substrate obtained by forming a non-magnetic undercoat layer on the base film was measured. Furthermore, the thickness (C) (C=the sum of the thicknesses of the base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by (B)–(A), and the thickness of the magnetic recording layer is expressed by (C)–(B).

Example 1

<Production of spindle-shaped goethite particles>

A reaction slurry containing 1440 g of spindle-shaped goethite particles containing 3.78% by weight of zirconium (calculated as Zr) based on the total weight of the particles, uniformly within the particles (average major axial diameter: 0.150 $\mu m$, average minor axial diameter: 0.0183 $\mu m$, aspect ratio: 8.2, BET specific surface area: 151.6 $m^2/g$, geometrical standard deviation: 1.36) obtained from an aqueous ferrous sulfate solution, an aqueous zirconium oxysulfate solution and an aqueous sodium carbonate solution by the afore-mentioned method (B) was obtained.

After the slurry was filtered through a press filter, pure water was passed until the electric conductivity of the filtrate became not more than 30 $\mu s$. The particles were then dried and pulverized so as to obtain 1380 g of spindle-shaped goethite particles containing zirconium uniformly within the particles. The resin adsorptivity measured 65.3%.

The spindle-shaped goethite particles were used as the non-magnetic particles for a later-described non-magnetic undercoat layer A.

<Production of low-density spindle-shaped hematite particles>

1200 g of the thus-obtained spindle-shaped goethite particles was suspended in water so as to obtain a slurry, and the concentration of the solid content was adjusted to 8 g/liter. 150 liter of the slurry was heated to 60° C. and the pH value of the slurry was adjusted to 9.0 by adding a 0.1-N aqueous NaOH solution.

To the alkali slurry was gradually added 36.0 g of #3 water glass as a sintering preventive, and after the end of addition, the resultant mixture was aged for 60 minutes. The pH value of the slurry was then adjusted to 6.0 by adding a 0.1-N acetic acid solution. Thereafter, the particles were filtered out, washed with water, dried and pulverized by an ordinary method, thereby producing 1165 g of spindle-shaped goethite particles coated with a silicon oxide. The $SiO_2$ content was 0.83% by weight.

1000 g of the spindle-shaped goethite particles obtained were charged into a stainless steel rotary furnace, and heat-treated and dehydrated in the air at 340° C. for 60 minutes while rotating the furnace, to obtain low-density spindle-shaped hematite particles.

100 g of the low-density spindle-shaped hematite particles obtained were charged into 1 liter of pure water and siaggregated by a homomixer (produced by Tokushu-kika Kogyo, Co., Ltd.), then filtered through a Buchner filter, and pure water was passed until the electric conductivity of the filtrate became not more than 30 Rs. The particles were then dried and pulverized to obtain 98 g of low-density spindle-shaped hematite particles.

The thus-obtained low-density spindle-shaped hematite particles containing zirconium had an average major axial diameter of 0.116 $\mu m$, an average minor axial diameter of 0.0153 $\mu m$, and an aspect ratio of 7.6. The BET specific surface area ($S_{BET}$) was 187.6 $m^2/g$, the $S_{BET}/S_{TEM}$ value (degree of densification) was 3.50. The Zr content was 4.15% by weight, the geometrical standard deviation was 1.36 and the resin adsorptivity was 68.8%. The low-density spindle-shaped hematite particles were used as the non-magnetic particles for a later-described non-magnetic undercoat layer B.

<Production of high-density sppindle-shaped hematite particles>

850 g of the low-density spindle-shaped hematite particles were then charged into a ceramic rotary furnace, and heat-treated in the air at 670° C. for 25 minutes while rotating the furnace so as to fill in dehydration pores.

100 g of the high-density spindle-shaped hematite particles obtained were charged into 1 liter of pure water and diaggregated by a homomixer (produced by Tokushu-kika Kogyo, Co., Ltd.), then filtered through a Buchner filter, and pure water was passed until the electric conductivity of the filtrate became not more than 30 μs. The particles were then dried and pulverized to obtain high-density spindle-shaped hematite particles.

The thus-obtained high-density spindle-shaped hematite particles had an average major axial diameter of 0.115 μm, an average minor axial diameter of 0.0155 μm, and an aspect ratio of 7.4. The BET specific surface area ($S_{BET}$) was 60.3 $M^2$/g, $S_{BET}/S_{TEM}$ value (degree of densification) was 1.14. and the geometrical standard deviation was 1.36. The Zr content was 4.15% by weight and the resin adsorptivity was 73.8%. The high-density spindle-shaped hematite particles were used as the non-magnetic particles for a later-described non-magnetic undercoat layer C.

<Production of a non-magnetic undercoat layer>

12 g of the spindle-shaped goethite particles, the low-density spindle-shaped r hematite particles or the high-density spindle-shaped hematite particles obtained in the above were mixed with a binder resin solution (30% by weight of vinyl chloride-vinyl acetate copolymer resin having a sodium sulfonate group and 70% by weight of cyclohexanone) and cyclohexanone, and each of the obtained mixtures (solid content: 72% by weight) was kneaded by a plast-mill for 30 minutes.

Each of the thus-obtained kneaded material was charged into a 140 ml-glass bottle together with 95 g of 1.5 mmφ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the obtained mixture was mixed and dispersed by a paint shaker for 6 hours to obtain a non-magnetic coating composition.

The thus-obtained non-magnetic coating composition containing the spindle-shaped goethite particles, the low-density spindle-shaped hematite particles or the high-density spindle-shaped hematite particles was as follows:

| | |
|---|---|
| Spindle-shaped goethite particles, low-density spindle-shaped hematite particles or high-density spindle-shaped hematite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methylethyl ketone | 111.4 parts by weight |
| Toluene | 66.9 parts by weight |

The viscosity of the obtained non-magnetic coating composition by using the spindle-shaped goethite particles was 8960 cP, the viscosity of the obtained non-magnetic coating composition by using the low-density spindle-shaped hematite particles was 9728 cP or the viscosity of the obtained non-magnetic coating composition by using the high-density spindle-shaped hematite particles was 384 cP. The respective non-magnetic coating composition obtained was applied to a polyethylene terephthalate film of 12 μm thick to a thickness of 55 μm by an applicator, and the coating film was then dried, thereby forming a non-magnetic undercoat layer. The thickness of the non-magnetic undercoat layer A was 3.6 μm, the thickness of the non-magnetic undercoat layer B was 3.5 μm, and the thickness of the non-magnetic undercoat layer C was 3.3 μm.

The non-magnetic undercoat layer A produced from the spindle-shaped goethite particles as the non-magnetic particles had a gloss of 181%, and a surface roughness Ra of 11.6 nm. The Young's modulus (relative value) thereof was 133.

The non-magnetic undercoat layer B produced from the pR. low-density spindle-shaped hematite particles as the non-magnetic particles had a gloss of 190%, and a surface roughness Ra of 10.2 nm. The Young's modulus (relative value) thereof was 133.

The non-magnetic undercoat layer C produced from the high-density spindle-shaped hematite particles as the non-magnetic particles had a gloss of 206%, and a surface roughness Ra of 6.9 nm. The Young's modulus (relative value) thereof was 135.

Example 2

<Production of a magnetic recording layer>

12 g of magnetic acicular metal particles containing iron as a main component (average major axial diameter: 0.153 μm, average minor axial diameter: 0.0191 μm, aspect ratio: 8.01:1, coercive force: 1710 Oe, saturation magnetization: 125.3 emu/g, geometric standard deviation: 1.35), 1.2 g of a polishing agent (AKP-30: trade name, produced by Sumitomo Chemical Co., Ltd.), 0.36 g of carbon black (#3250B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mmφ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Magnetic acicular metal particles containing iron as a main component | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black (#3250B) | 3.0 parts by weight |
| Lubricant (myristic acid: butyl stearate = 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The magnetic coating composition obtained was applied to the non-magnetic undercoat layer A, B or C to a thickness of 15 $μm^{-1}$ by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 1.1 µm.

The coercive force Hc of the magnetic tape produced by forming a magnetic recording layer on the non-magnetic undercoat layer A was 1771 Oe, the squareness (Br/Bm) thereof was 0.87, the gloss thereof was 195%, the surface roughness Ra thereof was 10.2 nm, the Young's modulus (relative value) thereof was 136, the linear absorption coefficient thereof was 1.23 µm$^{-1}$, the running durability thereof was 21.2 minutes, and the scratch resistance thereof was B.

The coercive force Hc of the magnetic tape produced by forming a magnetic recording layer on the non-magnetic undercoat layer B was 1773 Oe, the squareness (Br/Bm) thereof was 0.87, the gloss thereof was 200%, the surface roughness Ra thereof was 8.8 nm, the Young's modulus (relative value) thereof was 137, the linear absorption coefficient thereof was 1.23 µm$^{-1}$, the running durability thereof was 24.6 minutes, and the scratch resistance thereof was A.

The coercive force Hc of the magnetic tape produced by forming a magnetic recording layer on the non-magnetic undercoat layer C was 1780 Oe, the squareness (Br/Bm) thereof was 0.89, the gloss thereof was 216%, the surface roughness Ra thereof was 7.0 nm, the Young's modulus (relative value) thereof was 137, the linear absorption coefficient thereof was 1.23, the running durability thereof was 27.6 minutes, and the scratch resistance thereof was A.

Example 3
<Production of a magnetic medium>

Magnetic media were produced in the same way as in Example 2 except for the following magnetic acicular metal particles containing iron as a main component and aluminum.

Magnetic acicular particles

Magnetic acicular metal particles containing iron as a main component (average major axial diameter: 0.115 µm, average minor axial diameter: 0.0173 µm, aspect ratio: 6.4:1, coercive force: 1901 Oe, saturation magnetization: 131.0 emu/g, geometric standard deviation: 1.37, resin adsorptivity: 74.6%) which contained 1.12% by weight of aluminum in the central portion and 0.21% by weight of aluminum in the surface portion (calculated as Al).

Magnetic tapes

The coercive force Hc of the magnetic tape produced by forming a magnetic recording layer on the non-magnetic undercoat layer A was 1981 Oe, the squareness (Br/Bm) thereof was 0.88, the gloss thereof was 198%, the surface roughness Ra thereof was 8.9 nm, the Young's modulus (relative value) thereof was 135, the linear absorption coefficient thereof was 1.24 µm$^{-1}$, the running durability thereof was 23.8 minutes, and the scratch resistance thereof was A.

The coercive force Hc of the magnetic tape produced by forming a magnetic recording layer on the non-magnetic undercoat layer B was 1986 Oe, the squareness (Br/Bm) thereof was 0.88, the gloss thereof was 204%, the surface roughness Ra thereof was 8.2 nm, the Young's modulus (relative value) thereof was 135, the linear absorption coefficient thereof was 1.24 µm$^{-1}$, the running durability thereof was 24.9 minutes, and the scratch resistance thereof was A.

The coercive force Hc of the magnetic tape produced by forming a magnetic recording layer on the non-magnetic undercoat layer C was 1990 Oe, the squareness (Br/Bm) thereof was 0.90, the gloss thereof was 229%, the surface roughness Ra thereof was 6.8 nm, the Young's modulus (relative value) thereof was 137, the linear absorption coefficient thereof was 1.27 µm$^{-1}$, the running durability thereof was not less than 30 minutes, and the scratch resistance thereof was A.

<Kinds of acicular goethite particles>

Acicular goethite particles containing zirconium uniformly within the particles A1 and A8 as non-magnetic particles for non-magnetic undercoat layer, were prepared.

The main producing conditions and various properties of the acicular goethite particles A1 and A8 are shown in Tables 1 and 2, respectively.

<Kinds of acicular hematite particles>

Acicular hematite particles containing zirconium uniformly within the particles which were different in the basic production reaction of the acicular goethite particles containing zirconium uniformly within the particles as the precursor, zirconium content, kind and amount of sintering preventive were prepared.

The main producing conditions and various properties of the acicular hematite particles A2 to A7 and A9 to A11 are shown in Tables 1 and 2, respectively.

The surfaces of the non-magnetic acicular particles were coated in the following method except for varying the kind of non-magnetic particles, and the kind and amount of coating material.

5 liter of slurry containing the non-magnetic particles A4 and having a concentration of 99 g/liter was heated to 60° C., and 155.8 ml of a 1.0-N NaAlO$_2$ solution (equivalent to 0.85% by weight (calculated as Al) based on the non-magnetic acicular particles) was added to the slurry, and the mixture was held for 30 minutes. Thereafter, the pH value of the resultant mixture was adjusted to 7.5 by using acetic acid. The particles were then filtered out, washed with water, dried and pulverized in the same way as in Example 1, thereby obtaining non-magnetic acicular particles coated with a coating material.

Examples 4 to 10. Comparative Examples 1 to 4
<Production of a non-magnetic undercoat layer>

Non-magnetic undercoat layers were obtained in the same was as in Example 1 by using the non-magnetic particles A1 to A11.

The main producing conditions and various properties are shown in Table 3.

Examples 11 to 27, Comparative Examples 5 to 12
<Production of a magnetic medium>

Magnetic media were produced in the same way as in Example 2 except for the kind of non-magnetic undercoat layer and the kind of magnetic particles.

The main producing conditions and various properties are shown in Tables 4 and 5.

Examples 28 to 44, Comparative Examples 13 to 20
<Production of a magnetic medium>

4 kinds of magnetic acicular particles shown in Table 6 were prepared as the magnetic particles.

Magnetic media were produced in the same way as in Example 2 except for the kind of non-magnetic undercoat layer and the kind of magnetic acicular metal particles containing iron as a main component.

The main producing conditions and various properties are shown in Tables 7 and 8.

TABLE 1

| Kind of non-magnetic acicular particles | Process for production of non-magnetic acicular particles | | | |
|---|---|---|---|---|
| | Basic reaction for production of acicular goethite particles | Anti-sintering treatment | | |
| | | Kind | Calculated as | Amount (w %) |
| A1 | Goethite particles | B | — | — | — |
| A2 | low-density hematite particles | C | Water glass #3 | $SiO_2$ | 0.96 |
| A3 | high-density hematite particles | D | Sodium hexameta-phosphate | P | 0.46 |
| A4 | high-density hematite particles | E | Water glass #3 | $SiO_2$ | 1.06 |
| A5 | high-density hematite particles | A | Sodium hexameta-phosphate | P | 0.78 |
| A6 | high-density hematite particles | B | Phosphoric acid | P | 1.68 |
| A7 | high-density hematite particles | F | Water glass #3 | $SiO_2$ | 0.65 |
| | | | Sodium hexameta-phosphate | P | 0.86 |
| A8 | Goethite particles | B | — | — | — |
| A9 | low-density hematite particles | B | Boric acid | B | 0.87 |
| A10 | high-density hematite particles | B | Sodium hexameta-phosphate | P | 0.53 |
| A11 | high-density hematite particles | B | Colloidal silica | $SiO_2$ | 1.36 |
| | | | Phosphoric acid | P | 0.14 |

TABLE 2

| Kind of non-magnetic acicular particles | Properties of non-magnetic acicular particles | | | |
|---|---|---|---|---|
| | Average major axis diameter (μm) | Average minor axis diameter (μm) | Geometrical standard deviation (-) | Aspect ratio (-) |
| A1 | 0.111 | 0.0148 | 1.36 | 7.5:1 |
| A2 | 0.153 | 0.0173 | 1.35 | 8.8:1 |
| A3 | 0.120 | 0.0172 | 1.40 | 7.0:1 |
| A4 | 0.103 | 0.0160 | 1.37 | 6.4:1 |
| A5 | 0.173 | 0.0188 | 1.35 | 9.2:1 |
| A6 | 0.130 | 0.0150 | 1.39 | 8.7:1 |
| A7 | 0.165 | 0.0241 | 1.39 | 6.8:1 |
| A8 | 0.156 | 0.0183 | 1.35 | 8.5:1 |
| A9 | 0.249 | 0.0331 | 1.36 | 7.5:1 |
| A10 | 0.186 | 0.0220 | 1.43 | 8.5:1 |
| A11 | 0.223 | 0.0269 | 1.46 | 8.3:1 |

| Kind of non-magnetic acicular particles | Properties of non-magnetic acicular particles | | | |
|---|---|---|---|---|
| | $S_{BET}$ (m²/g) | $S_{TEM}$ (m²/g) | $S_{BET}/S_{TEM}$ value (-) | Zr content (wt %) |
| A1 | 158.2 | — | — | 1.56 |
| A2 | 176.8 | — | — | 2.84 |
| A3 | 51.2 | 47.9 | 1.07 | 0.65 |
| A4 | 57.3 | 51.8 | 1.11 | 3.16 |
| A5 | 50.6 | 43.1 | 1.17 | 5.01 |
| A6 | 63.2 | 54.2 | 1.17 | 0.52 |
| A7 | 43.6 | 34.2 | 1.27 | 1.03 |
| A8 | 110.0 | — | — | 0.01 |
| A9 | 125.6 | — | — | 0.00 |
| A10 | 47.6 | 37.0 | 1.29 | 0.00 |
| A11 | 38.7 | 30.3 | 1.28 | 0.03 |

| Kind of non-magnetic acicular particles | Properties of non-magnetic acicular particles | | | Resin adsorption (%) |
|---|---|---|---|---|
| | Surface-coating material | | | |
| | Kind of coating material | Calculated as | Amount treated (wt %) | |
| A1 | Hydroxide of aluminum | Al | 1.02 | 65.9 |
| A2 | Oxide of silicon | $SiO_2$ | 0.46 | 73.8 |
| A3 | — | — | — | 70.2 |
| A4 | Hydroxide of aluminum | Al | 0.83 | 74.1 |
| A5 | Oxide of silicon | $SiO_2$ | 1.25 | 74.8 |
| A6 | Hydroxide of aluminum | Al | 3.01 | 79.2 |
| A7 | Hydroxide of aluminum | Al | 0.64 | 77.7 |
| | Oxide of silicon | $SiO_2$ | 0.32 | |
| A8 | — | — | — | 44.4 |
| A9 | — | — | — | 46.5 |
| A10 | Hydroxide of zirconium | Zr | 1.21 | 54.6 |
| A11 | Hydroxide of aluminum | Al | 0.11 | 58.6 |

TABLE 3

| Examples and Comparative Examples | Production of non-magnetic coating composition | | |
|---|---|---|---|
| | Kind of non-magnetic acicular particles | Weight ratio of particles to resin (-) | Viscosity (cP) |
| Example 4 | A1 | 5.0 | 7,680 |
| Example 5 | A2 | 5.0 | 8,448 |
| Example 6 | A3 | 5.0 | 461 |
| Example 7 | A4 | 5.0 | 435 |
| Example 8 | A5 | 5.0 | 384 |
| Example 9 | A6 | 5.0 | 358 |
| Example 10 | A7 | 5.0 | 333 |
| Comparative Example 1 | A8 | 5.0 | 9,933 |
| Comparative Example 2 | A9 | 5.0 | 7,373 |
| Comparative Example 3 | A10 | 5.0 | 461 |
| Comparative Example 4 | A11 | 5.0 | 384 |

| Examples and Comparative Examples | Properties of non-magnetic undercoat layer | | | |
|---|---|---|---|---|
| | Thickness (μm) | Gloss (%) | Surface roughness Ra (nm) | Young's (relative value) (%) |
| Example 4 | 3.1 | 183 | 11.4 | 131 |
| Example 5 | 3.1 | 185 | 10.8 | 135 |
| Example 6 | 3.1 | 196 | 8.9 | 134 |
| Example 7 | 3.0 | 214 | 6.6 | 132 |

TABLE 3-continued

| | | | | |
|---|---|---|---|---|
| Example 8 | 3.0 | 193 | 7.4 | 132 |
| Example 9 | 3.1 | 204 | 6.4 | 135 |
| Example 10 | 3.1 | 198 | 6.5 | 137 |
| Comparative Example 1 | 3.2 | 136 | 28.9 | 114 |
| Comparative Example 2 | 3.1 | 146 | 17.6 | 119 |
| Comparative Example 3 | 3.0 | 169 | 15.4 | 124 |
| Comparative Example 4 | 3.1 | 165 | 16.0 | 125 |

TABLE 4

Properties of magnetic coating composition

| Examples | Kind of non-magnetic undercoat layer | Kind of magnetic particles | Weight ratio of particles to resin (−) |
|---|---|---|---|
| Example 11 | Example 1 (A) | Magnetic acicular metal particles | 5.0 |
| Example 12 | Example 1 (B) | Major axis diameter: 0.120 μm | 5.0 |
| Example 13 | Example 1 (C) | Minor axis diameter: 0.0177 μm | 5.0 |
| Example 14 | Example 4 | Aspect ratio: 6.8:1 | 5.0 |
| Example 15 | Example 5 | Hc: 1,950 Oe | 5.0 |
| Example 16 | Example 6 | σs: 130.5 emu/g | 5.0 |
| Example 17 | Example 7 | Magnetic metal particles | 5.0 |
| Example 18 | Example 8 | used | 5.0 |
| Example 19 | Example 9 | in Example 1 | 5.0 |
| Example 20 | Example 10 | | 5.0 |
| Example 21 | Example 4 | Co-coated acicular magnetite particles | 5.0 |
| Example 22 | Example 5 | | 5.0 |
| Example 23 | Example 6 | Major axis diameter: 0.118 μm | 5.0 |
| Example 24 | Example 7 | | 5.0 |
| Example 25 | Example 8 | Minor axis diameter: 0.0179 μm | 5.0 |
| Example 26 | Example 9 | | 5.0 |
| Example 27 | Example 10 | Aspect ratio: 6.6:1 Hc: 841 Oe; σs: 76.1 emu/g; Co: 4.21 wt % | 5.0 |

Properties of magnetic recording medium

| Examples | Thickness of magnetic recording layer (μm) | Coercive force (Hc) (Oe) | Br/Bm value (−) | Gloss (%) |
|---|---|---|---|---|
| Example 11 | 1.0 | 2,002 | 0.88 | 196 |
| Example 12 | 1.0 | 1,996 | 0.88 | 208 |
| Example 13 | 1.1 | 1,993 | 0.88 | 214 |
| Example 14 | 1.1 | 1,996 | 0.87 | 199 |
| Example 15 | 1.0 | 2,008 | 0.88 | 209 |
| Example 16 | 1.1 | 1,996 | 0.88 | 218 |
| Example 17 | 1.0 | 1,786 | 0.89 | 218 |
| Example 18 | 1.1 | 1,770 | 0.88 | 216 |
| Example 19 | 1.1 | 1,780 | 0.89 | 220 |
| Example 20 | 1.1 | 1,782 | 0.89 | 206 |
| Example 21 | 1.0 | 892 | 0.89 | 184 |
| Example 22 | 1.1 | 893 | 0.90 | 186 |
| Example 23 | 1.1 | 890 | 0.91 | 190 |
| Example 24 | 1.1 | 886 | 0.91 | 200 |
| Example 25 | 1.0 | 891 | 0.90 | 201 |
| Example 26 | 1.0 | 892 | 0.90 | 195 |
| Example 27 | 1.1 | 890 | 0.91 | 194 |

TABLE 4-continued

Properties of magnetic recording medium

| Examples | Surface roughness Ra (nm) | Young's modulus (relative value) | Linear absorption (μm$^{-1}$) | Durability Running time (min) | Durability Scratch resistance property |
|---|---|---|---|---|---|
| Example 11 | 10.8 | 134 | 1.24 | 21.9 | B |
| Example 12 | 10.4 | 134 | 1.22 | 24.1 | B |
| Example 13 | 7.4 | 133 | 1.25 | ≧30 | A |
| Example 14 | 10.2 | 133 | 1.27 | 21.8 | B |
| Example 15 | 9.6 | 135 | 1.29 | 23.6 | A |
| Example 16 | 6.2 | 133 | 1.31 | 25.1 | A |
| Example 17 | 6.2 | 132 | 1.36 | 22.4 | B |
| Example 18 | 6.2 | 134 | 1.37 | 27.3 | A |
| Example 19 | 5.8 | 136 | 1.38 | ≧30 | A |
| Example 20 | 8.2 | 137 | 1.36 | ≧30 | A |
| Example 21 | 10.8 | 132 | 1.28 | 26.6 | B |
| Example 22 | 9.9 | 134 | 1.25 | 25.9 | B |
| Example 23 | 8.6 | 132 | 1.25 | ≧30 | A |
| Example 24 | 6.2 | 133 | 1.28 | 29.5 | A |
| Example 25 | 6.4 | 135 | 1.29 | ≧30 | A |
| Example 26 | 7.0 | 136 | 1.27 | ≧30 | A |
| Example 27 | 7.2 | 136 | 1.31 | ≧30 | A |

TABLE 5

Properties of magnetic coating composition

| Comparative Examples | Kind of non-magnetic undercoat layer | Kind of magnetic particles | Weight ratio of particles to resin (−) |
|---|---|---|---|
| Comparative Example 5 | Comparative Example 1 | Magnetic acicular metal particles | 5.0 |
| Comparative Example 6 | Comparative Example 2 | Major axis diameter: 0.120 μm | 5.0 |
| Comparative Example 7 | Comparative Example 3 | Minor axis diameter: 0.0177 μm | 5.0 |
| Comparative Example 8 | Comparative Example 4 | Aspect ratio: 6.8:1 Hc: 1,950 Oe σs: 130.5 emu/g | 5.0 |
| Comparative Example 9 | Comparative Example 1 | Co-coated acicular magnetic particles | 5.0 |
| Comparative Example 10 | Comparative Example 2 | Major axis diameter: 0.118 μm | 5.0 |
| Comparative Example 11 | Comparative Example 3 | Minor axis diameter: 0.0179 μm | 5.0 |
| Comparative Example 12 | Comparative Example 4 | Aspect ratio: 6.6:1 Hc: 841 Oe; σs: 76.1 emu/g; Co: 4.21 wt % | 5.0 |

Properties of magnetic recording medium

| Comparative Examples | Thickness of magnetic recording layer (μm) | Coercive force (Hc) (Oe) | Br/Bm value (−) | Gloss (%) |
|---|---|---|---|---|
| Comparative Example 5 | 1.1 | 1,968 | 0.84 | 160 |
| Comparative Example 6 | 1.1 | 1,974 | 0.84 | 164 |
| Comparative Example 7 | 1.1 | 1,974 | 0.85 | 176 |
| Comparative Example 8 | 1.0 | 1,971 | 0.86 | 173 |
| Comparative Example 9 | 1.1 | 870 | 0.84 | 146 |

TABLE 5-continued

| | | | | |
|---|---|---|---|---|
| Comparative Example 10 | 1.1 | 876 | 0.86 | 159 |
| Comparative Example 11 | 1.1 | 871 | 0.85 | 163 |
| Comparative Example 12 | 1.1 | 879 | 0.86 | 166 |

| | Properties of magnetic recording medium | | | |
|---|---|---|---|---|
| | | Young's modulus | Linear | Durability |
| Comparative Examples | Surface roughness Ra (nm) | (relative value) (%) | absorption ($\mu m^{-1}$) | Running time (min) / Scratch resistance property |
| Comparative Example 5 | 21.8 | 120 | 1.07 | 2.7 / D |
| Comparative Example 6 | 18.4 | 121 | 1.14 | 7.2 / D |
| Comparative Example 7 | 14.4 | 121 | 1.22 | 10.6 / C |
| Comparative Example 8 | 16.2 | 122 | 1.26 | 13.2 / C |
| Comparative Example 9 | 20.8 | 123 | 1.14 | 8.8 / D |
| Comparative Example 10 | 18.4 | 120 | 1.18 | 11.6 / D |
| Comparative Example 11 | 14.4 | 126 | 1.25 | 14.2 / C |
| Comparative Example 12 | 13.2 | 128 | 1.25 | 14.6 / C |

TABLE 6

| Kind of magnetic acicular metal particles containing iron as a main component | Properties of magnetic acicular metal particles containing iron as a main component | | |
|---|---|---|---|
| | Average major axis diameter ($\mu m$) | Average minor axis diameter ($\mu m$) | Geometrical standard deviation (-) |
| Magnetic metal particles (1) | 0.125 | 0.0178 | 1.38 |
| Magnetic metal particles (2) | 0.119 | 0.0169 | 1.36 |
| Magnetic metal particles (3) | 0.110 | 0.0165 | 1.40 |
| Magnetic metal particles (4) | 0.118 | 0.0186 | 1.36 |

| Kind of magnetic acicular metal particles containing iron as a main component | Properties of magnetic acicular metal particles containing iron as a main component | | |
|---|---|---|---|
| | Aspect ratio (-) | Coercive force (Hc) (Oe) | Saturation magnetization (emu/g) |
| Magnetic metal particles (1) | 7.0:1 | 1,910 | 134.8 |
| Magnetic metal particles (2) | 7.0:1 | 1,965 | 131.2 |
| Magnetic metal particles (3) | 6.6:1 | 2,166 | 121.6 |
| Magnetic metal particles (4) | 6.3:1 | 1,876 | 127.1 |

| Kind of magnetic Acicular metal particles containing iron as a main component | Properties of magnetic acicular metal particles containing iron as a main component | | | | |
|---|---|---|---|---|---|
| | Content of Al | | Content of Nd in | | |
| | Inside of particles | | Surface coating layer (wt %) | surface-coating layer (wt %) | Resin adsorption (%) |
| | Central portion (wt %) | Surface portion (wt %) | | | |
| Magnetic metal particles (1) | 1.39 | 1.39 | 0.01 | 0.01 | 78.9 |
| Magnetic metal particles (2) | 0.21 | 1.26 | 0.03 | 0.47 | 81.3 |
| Magnetic metal particles (3) | 1.11 | 2.20 | 0.98 | 2.56 | 85.6 |
| Magnetic metal particles (4) | 0.01 | 0.01 | 0.01 | 0.02 | 58.0 |

TABLE 7

| Examples | Kind of non-magnetic undercoat layer | Kind of magnetic particles | Weight ratio of particles to resin (-) |
|---|---|---|---|
| Example 28 | Example 1 (A) | Magnetic metal particles (1) | 5.0 |
| Example 29 | Example 1 (B) | Magnetic metal particles (2) | 5.0 |
| Example 30 | Example 1 (C) | Magnetic metal particles (3) | 5.0 |
| Example 31 | Example 4 | Particles obtained in Example 3 | 5.0 |
| Example 32 | Example 4 | Magnetic metal particles (1) | 5.0 |
| Example 33 | Example 5 | Magnetic metal particles (2) | 5.0 |
| Example 34 | Example 5 | Magnetic metal particles (3) | 5.0 |
| Example 35 | Example 6 | Magnetic metal particles (1) | 5.0 |
| Example 36 | Example 6 | Magnetic metal particles (2) | 5.0 |
| Example 37 | Example 7 | Magnetic metal particles (1) | 5.0 |
| Example 38 | Example 7 | Magnetic metal particles (3) | 5.0 |
| Example 39 | Example 8 | Magnetic metal particles (2) | 5.0 |
| Example 40 | Example 8 | Nagnetic metal particles (3) | 5.0 |
| Example 41 | Example 9 | Particles obtained in Example 3 | 5.0 |
| Example 42 | Example 9 | Magnetic metal particles (1) | 5.0 |
| Example 43 | Example 10 | Magnetic metal particles (2) | 5.0 |
| Example 44 | Example 10 | Magnetic metal particles (3) | 5.0 |

| Examples | Properties of magnetic recording medium | | | |
|---|---|---|---|---|
| | Thickness of magnetic recording layer ($\mu m$) | Coercive force (Hc) (Oe) | Br/Bm value (-) | Gloss (%) |
| Example 28 | 1.2 | 1,971 | 0.87 | 196 |
| Example 29 | 1.2 | 2,020 | 0.88 | 199 |
| Example 30 | 1.1 | 2,215 | 0.89 | 228 |

TABLE 7-continued

| Examples | Surface roughness Ra (nm) | Young's modulus (relative value) (%) | Linear absorption ($\mu m^{-1}$) | Durability Running time (min) | Durability Scratch resistance property |
|---|---|---|---|---|---|
| Example 31 | 1.2 | 1,928 | 0.88 | 200 | |
| Example 32 | 1.1 | 1,969 | 0.88 | 201 | |
| Example 33 | 1.1 | 2,010 | 0.89 | 212 | |
| Example 34 | 1.1 | 2,201 | 0.90 | 223 | |
| Example 35 | 1.1 | 1,965 | 0.89 | 218 | |
| Example 36 | 1.1 | 1,976 | 0.89 | 221 | |
| Example 37 | 1.0 | 1,988 | 0.88 | 226 | |
| Example 38 | 1.1 | 2,216 | 0.90 | 235 | |
| Example 39 | 1.2 | 2,020 | 0.89 | 230 | |
| Example 40 | 1.1 | 2,248 | 0.90 | 238 | |
| Example 41 | 1.0 | 1,946 | 0.89 | 216 | |
| Example 42 | 1.1 | 1,968 | 0.90 | 225 | |
| Example 43 | 1.1 | 2,035 | 0.91 | 224 | |
| Example 44 | 1.1 | 2,269 | 0.91 | 239 | |

Properties of magnetic recording medium

| Examples | Surface roughness Ra (nm) | Young's modulus (relative value) (%) | Linear absorption ($\mu m^{-1}$) | Running time (min) | Scratch resistance property |
|---|---|---|---|---|---|
| Example 28 | 10.6 | 134 | 1.24 | 22.4 | B |
| Example 29 | 9.8 | 135 | 1.22 | 25.1 | A |
| Example 30 | 6.3 | 133 | 1.31 | ≧30 | A |
| Example 31 | 8.8 | 138 | 1.25 | 23.6 | B |
| Example 32 | 8.2 | 137 | 1.26 | 22.6 | B |
| Example 33 | 7.8 | 134 | 1.31 | 25.1 | A |
| Example 34 | 7.2 | 135 | 1.36 | ≧30 | A |
| Example 35 | 7.4 | 133 | 1.35 | 28.6 | A |
| Example 36 | 7.2 | 133 | 1.25 | ≧30 | A |
| Example 37 | 7.0 | 137 | 1.30 | 29.8 | A |
| Example 38 | 6.6 | 139 | 1.25 | ≧30 | A |
| Example 39 | 6.8 | 131 | 1.23 | ≧30 | A |
| Example 40 | 6.0 | 140 | 1.24 | ≧30 | A |
| Example 41 | 7.2 | 138 | 1.26 | ≧30 | A |
| Example 42 | 6.8 | 140 | 1.23 | ≧30 | A |
| Example 43 | 7.4 | 135 | 1.23 | ≧30 | A |
| Example 44 | 5.8 | 139 | 1.23 | ≧30 | A |

TABLE 8

Properties of magnetic coating composition

| Comparative Examples | Kind of non-magnetic undercoat layer | Kind of magnetic particles | Weight ratio of particles to resin (-) |
|---|---|---|---|
| Comparative Example 13 | Comparative Example 1 | Magnetic metal particles (4) | 5.0 |
| Comparative Example 14 | Comparative Example 1 | Nagnetic metal particles (1) | 5.0 |
| Comparative Example 15 | Comparative Example 2 | Nagnetic metal particles (4) | 5.0 |
| Comparative Example 16 | Comparative Example 2 | Magnetic metal particles (1) | 5.0 |
| Comparative Example 17 | Comparative Example 3 | Magnetic metal particles (4) | 5.0 |
| Comparative Example 18 | Comparative Example 3 | Magnetic metal particles (1) | 5.0 |
| Comparative Example 19 | Comparative Example 4 | Magnetic metal particles (4) | 5.0 |
| Comparative Example 20 | Comparative Example 4 | Magnetic metal particles (1) | 5.0 |

Properties of magnetic recording medium

| Comparative Examples | Thickness of magnetic recording layer ($\mu m$) | Coercive force (Hc) (Oe) | Br/Bm value (-) | Gloss (%) |
|---|---|---|---|---|
| Comparative Example 13 | 1.2 | 1,918 | 0.83 | 149 |
| Comparative Example 14 | 1.1 | 1,948 | 0.84 | 168 |
| Comparative Example 15 | 1.2 | 1,912 | 0.84 | 176 |
| Comparative Example 16 | 1.1 | 1,951 | 0.85 | 186 |
| Comparative Example 17 | 1.1 | 1,908 | 0.86 | 191 |
| Comparative Example 18 | 1.1 | 1,949 | 0.86 | 198 |
| Comparative Example 19 | 1.2 | 1,921 | 0.86 | 200 |
| Comparative Example 20 | 1.0 | 1,968 | 0.87 | 206 |

Properties of magnetic recording medium

| Comparative Examples | Surface roughness Ra (nm) | Young's modulus (relative value) (%) | Linear absorption ($\mu m^{-1}$) | Running time (min) | Scratch resistance property |
|---|---|---|---|---|---|
| Comparative Example 13 | 25.6 | 122 | 1.10 | 1.6 | D |
| Comparative Example 14 | 22.4 | 123 | 1.15 | 8.8 | C |
| Comparative Example 15 | 17.8 | 123 | 1.18 | 3.8 | D |
| Comparative Example 16 | 15.4 | 125 | 1.21 | 13.6 | C |
| Comparative Example 17 | 14.4 | 123 | 1.13 | 5.2 | D |
| Comparative Example 18 | 13.4 | 125 | 1.14 | 15.1 | C |
| Comparative Example 19 | 13.6 | 126 | 1.22 | 9.6 | C |
| Comparative Example 20 | 12.8 | 130 | 1.24 | 19.2 | C |

What is claimed is:

1. A magnetic recording medium comprising:
   a base film;
   a non-magnetic undercoat layer formed on said base film, comprising a binder resin and non-magnetic acicular iron oxide hydroxide particles or acicular hematite particles containing uniformly within the particles 0.05 to 30% by weight of zirconium, calculated as Zr, based on the total weight of the particles; and
   a magnetic recording layer formed on said non-magnetic undercoat layer and comprising magnetic particles and a binder resin.

2. A magnetic recording medium according to claim 1, wherein said acicular iron oxide hydroxide particle or acicular hematite particle comprises:
   as a core particle, acicular iron oxide hydroxide particle or acicular hematite particle containing uniformly within the particle 0.05 to ,30% by weight of zirconium, calculated as Zr, based on the total weight of the particle, and
   a coating layer formed on the surface of said core particle, said coating layer comprising at least one compound selected from the group consisting of hydroxides of aluminum, oxides of aluminum, hydroxides of silicon and oxides of silicon.

3. A magnetic recording medium according to claim 1, wherein
said magnetic particles are magnetic acicular metal particles containing iron as a main component and 0.05 to 10% by weight of aluminum, calculated as Al, based on the total weight of the particles, which is present in, on or in and on the particle.

4. A magnetic recording medium according to claim 1, wherein said non-magnetic acicular iron oxide hydroxide particle or acicular hematite particle comprises:
as a core particle, non-magnetic acicular iron oxide hydroxide particle or acicular hematite particle containing uniformly within the particle 0.05 to 30% by weight of zirconium, calculated as Zr, based on the total weight of the particle, and
a coating layer formed on the surface of said core particle, said coating layer comprising at least one compound selected from the group consisting of hydroxides of aluminum, oxides of aluminum, hydroxides of silicon and oxides of silicon; and
wherein said magnetic particles are magnetic acicular metal particles containing iron as a main component and 0.05 to 10% by weight of aluminum, calculated as Al, based on the total weight of the particles, which is present in, on or in and on the particle.

5. A magnetic recording medium according to claim 1, wherein said non-magnetic acicular iron oxide hydroxide particles or acicular hematite particles have 0.005 to 0.3 μm of an average major axis diameter, 0.0025 to 0.15 μm of an average minor axis diameter, 2:1 to 20:1 of an aspect ratio (average major axis diameter/average minor axis diameter) and not more than 1.50 in geometrical standard deviation of a major axial diameter distribution thereof.

6. A magnetic recording medium according to claim 1, wherein said non-magnetic acicular iron oxide hydroxide particles or acicular hematite particles have a BET specific surface area ($S_{BET}$) of 35 to 300 m$^2$/g, a $S_{BET}/S_{TEM}$ value of 0.5 to 2.5, wherein $S_{TEM}$ represents a specific surface area calculated from values of major axial diameter and minor axial diameter obtained by measurement of particles on an electron microscope photograph, and a resin adsorptivity of not less than 60%.

7. A magnetic recording medium according to claim 1, wherein said non-magnetic acicular iron oxide hydroxide particles are acicular goethite particles.

8. A magnetic recording medium according to any of claim 2 or 4, wherein the amount of said coating layer on the surface of said non-magnetic acicular iron oxide hydroxide particles or acicular hematite particles as a core particle is 0.01 to 50% by weight, calculated as Al, SiO$_2$ or Al and SiO$_2$, based on the total weight of the particles.

9. A magnetic recording medium according to claim 1, wherein said magnetic particles have an average major axial diameter of 0.01 to 0.50 μm, an average minor axial diameter of 0.0007 to 0.17 μm, and an aspect ratio of 3:1 to 15:1.

10. A magnetic recording medium according to claim 1, which further has a coercive force of 250 to 4,000 Oe, a squareness ($B_r/B_m$) of 0.85 to 0.95, a gloss of 130 to 300%, a surface roughness of not more than 12.0 nm, a linear adsorption coefficient of 1.10 to 2.00 μm$^{-1}$ and a running durability of not less than 15 minutes.

11. A magnetic recording medium according to claim 1, which further has a coercive force of 800 to 3,500 Oe, a squareness ($B_r/B_m$) of 0.85 to 0.95, a gloss of 180 to 300%, a surface roughness of not more than 12.0 nm, a linear adsorption coefficient of 1.10 to 2.00 μm$^{-1}$ and a running durability of not less than 20 minutes.

12. A non-magnetic substrate for magnetic recording medium, comprising:
a base film; and
a non-magnetic undercoat layer formed on said base film, comprising a binder resin and non-magnetic acicular iron oxide hydroxide particles or acicular hematite particles containing uniformly within the particles 0.05 to 30% by weight of zirconium, calculated as Zr, based on the total weight of the particles.

13. A non-magnetic substrate for magnetic recording medium according to claim 12, wherein said non-magnetic acicular iron oxide hydroxide particles or acicular hematite particles comprise:
as a core particle, non-magnetic acicular iron oxide hydroxide particle or acicular hematite particle containing uniformly within the particle 0.05 to 30% by weight of zirconium, calculated as Zr, based on the total weight of the particle, and
a coating layer formed on the surface of said core particle, said coating layer comprising at least one compound selected from the group consisting of hydroxides of aluminum, oxides of aluminum, hydroxides of silicon and oxides of silicon.

14. A non-magnetic substrate for magnetic recording medium according to claim 12, wherein said non-magnetic acicular iron oxide hydroxide particles or acicular hematite particles have 0.005 to 0.3 μm of an average major axis diameter, 0.0025 to 0.15 μm of an average minor axis diameter, 2:1 to 20:1 of an aspect ratio (average major axis diameter/average minor axis diameter) and not more than 1.50 in geometrical standard deviation of a major axial diameter distribution thereof.

15. A non-magnetic substrate for magnetic recording medium according to claim 12, wherein said non-magnetic acicular iron oxide hydroxide particles or acicular hematite particles have a BET specific surface area ($S_{BET}$) of 35 to 300 m$^2$/g, a $S_{BET}/S_{TEM}$ value of 0.5 to 2.5, wherein $S_{TEM}$ represents a specific surface area calculated from values of major axial diameter and minor axial diameter obtained by measurement of particles on an electron microscope photograph, and a resin adsorptivity of not less than 60%.

16. A non-magnetic substrate for magnetic recording medium according to claim 12, wherein said non-magnetic acicular iron oxide hydroxide particles are acicular goethite particles.

17. A non-magnetic substrate for magnetic recording medium according to claim 12, wherein the amount of said coating layer on the surface of said non-magnetic acicular iron oxide hydroxide particle or acicular hematite particle as a core particle is 0.01 to 50% by weight, calculated as Al, SiO$_2$ or Al and SiO$_2$, based on the total weight of the particles.

18. Non-magnetic acicular iron oxide hydroxide particles or acicular hematite particles containing uniformly within the particles 0.05 to 30% by weight of zirconium, calculated as Zr, based on the total weight of the particles,
wherein said particles have 0.005 to 0.3 μm of an average major axis diameter, 0.0025 to 0.15 μm of an average minor axis diameter, 2:1 to 20:1 of an aspect ratio (average major axis diameter/average minor axis diameter), not more than 1.50 in geometrical standard deviation of a major axial diameter distribution thereof, 35 to 300 m$^2$/g of a BET specific surface area ($S_{BET}$), 0.5 to 2.5 of a $S_{BET}/S_{TEM}$ value, wherein $S_{TEM}$ represents a specific surface area calculated from values of major axial diameter and minor axial diameter obtained by measurement of particles on an electron microscope photograph, and not less than 60% of a resin adsorptivity.

19. Non-magnetic acicular iron oxide hydroxide particle or acicular hematite particle according to claim 18, which further have a coating layer formed on the surface of said particle comprising at least one compound selected from the group consisting of hydroxides of aluminum, oxides of aluminum, hydroxides of silicon and oxides of silicon,
   wherein the amount of said coating layer on the surface of said acicular iron oxide hydroxide particle or acicular hematite particle is 0.01 to 50% by weight, calculated as Al, $SiO_2$ or Al and $SiO_2$, based on the total weight of the particles.

* * * * *